US012437957B2

(12) United States Patent
Kruse

(10) Patent No.: US 12,437,957 B2
(45) Date of Patent: Oct. 7, 2025

(54) X-RAY CATHODE SHIELD

(71) Applicant: GE Precision Healthcare LLC, Wauwatosa, WI (US)

(72) Inventor: Kevin S Kruse, Muskego, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 181 days.

(21) Appl. No.: 18/296,943

(22) Filed: Apr. 6, 2023

(65) Prior Publication Data

US 2024/0339285 A1 Oct. 10, 2024

(51) Int. Cl.
*H01J 35/18* (2006.01)
*H01J 35/06* (2006.01)
*H01J 35/10* (2006.01)

(52) U.S. Cl.
CPC ............ *H01J 35/18* (2013.01); *H01J 35/066* (2019.05); *H01J 35/101* (2013.01)

(58) Field of Classification Search
CPC ........ H01J 35/101; H01J 35/18; H01J 35/066; H01J 1/52; H01J 2235/167; H01J 2235/1212; H01J 2235/165; H01J 35/16; H01J 35/26; H01J 2235/068; H01J 35/064; H01J 3/14; H01J 35/14; H01J 3/38; H01J 35/147; H01J 2235/0233; H01J 35/06; H01J 35/106; H01J 35/08; H01J 2235/166; H01J 35/112; H01J 2235/081; H01J 1/15; H01J 35/153; H01J 3/027; H01J 35/186; H01J 9/18; H01J 35/045; H01J 9/042; H01J 2235/06; H01J 35/065; G01N 23/04; G21F 3/00; H05G 1/04
USPC .................................. 378/119, 123, 134–138
See application file for complete search history.

(56) References Cited

U.S. PATENT DOCUMENTS

| | | | | |
|---|---|---|---|---|
| 2,472,745 | A | 6/1949 | Frevel | |
| 3,517,195 | A | 6/1970 | Leavitt | |
| 5,633,907 | A * | 5/1997 | Gravelle | H01J 35/066 378/138 |
| 7,236,569 | B2 | 6/2007 | Takeuchi | |
| 7,860,219 | B2 | 12/2010 | Clark et al. | |
| 9,177,754 | B2 | 11/2015 | Hansen et al. | |
| 2010/0040201 | A1 | 2/2010 | Lee | |
| 2017/0372864 | A1 * | 12/2017 | Anno | H01J 35/153 |
| 2018/0223908 | A1 * | 8/2018 | Hunt | F16C 33/72 |
| 2019/0304734 | A1 | 10/2019 | Matsuura | |

(Continued)

FOREIGN PATENT DOCUMENTS

| | | | |
|---|---|---|---|
| EP | 0590418 | B1 | 8/1996 |
| EP | 3251142 | B1 | 5/2020 |

(Continued)

OTHER PUBLICATIONS

EP application 24163162.1 filed Mar. 13, 2024—partial Search Report issued Aug. 12, 2024; 13 pages.

(Continued)

*Primary Examiner* — Irakli Kiknadze
(74) *Attorney, Agent, or Firm* — McCoy Russell LLP

(57) ABSTRACT

Various systems are provided for a cathode of an X-ray imaging system. In one example, a shield assembly for a cathode comprises a first shield part and a second shield part, the first shield part and the second shield part spaced apart such that the first shield part and the second shield part are not in direct physical contact.

20 Claims, 11 Drawing Sheets

(56) References Cited

U.S. PATENT DOCUMENTS

| | | | | |
|---|---|---|---|---|
| 2020/0365363 | A1* | 11/2020 | Park | H01J 35/18 |
| 2023/0197397 | A1 | 6/2023 | Lemaitre | |

FOREIGN PATENT DOCUMENTS

| | | | |
|---|---|---|---|
| JP | s4873575 | U | 9/1973 |
| WO | 2018079946 | A1 | 5/2018 |

OTHER PUBLICATIONS

EP application 24163162.1 filed Mar. 13, 2024—extended Search Report issued Dec. 9, 2024; 17 pages.

EP0590418 English Abstract; obtained from Espacenet.com; 1 page.

* cited by examiner

X-RAY CATHODE SHIELD

FIELD

Embodiments of the subject matter disclosed herein relate to a cathode for imaging systems, for example, X-ray imaging systems.

BACKGROUND

In an X-ray tube, ionizing radiation is created by accelerating electrons in a vacuum from a cathode to an anode via an electric field. The electrons originate from a filament of the cathode with current flowing therethrough. The filament may be heated by a current flowing through it to liberate electrons from the cathode and accelerate the electrons toward the anode. Additional filaments heated by currents at different voltages may be used to focus the electron beam towards the anode, and to influence the size and position of the X-ray emitting spot. The cathode may be configured with shielding elements on exterior surfaces, electro-polished shields for example, to maintain high voltage stability.

BRIEF DESCRIPTION

In one embodiment, a shield assembly for a cathode comprises a first shield part and a second shield part, the first shield part and the second shield part spaced apart so that the first shield part and the second shield part are not in direct physical contact.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
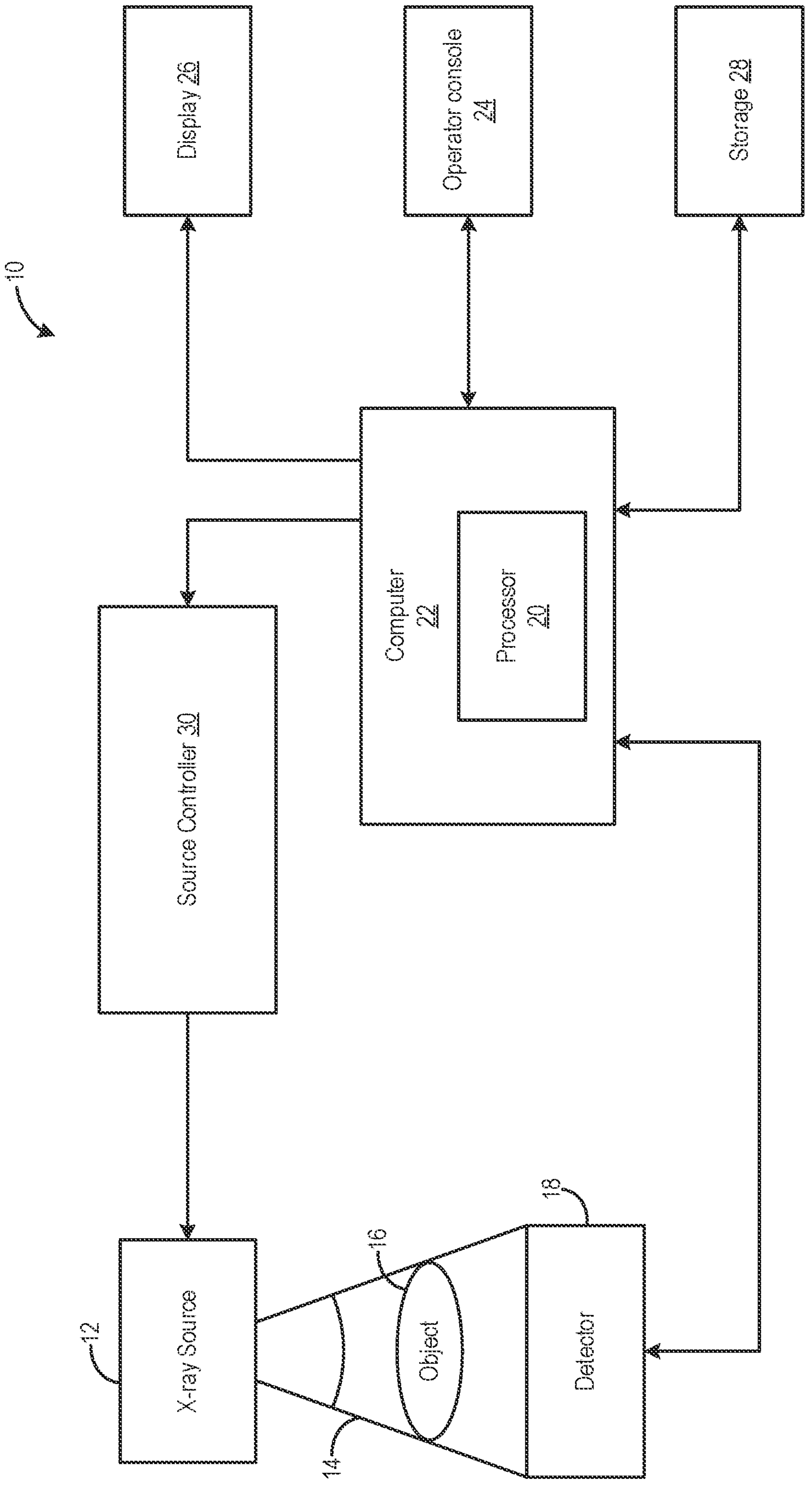
FIG. 1 shows a block diagram of an example of an imaging system.
Figure 2:
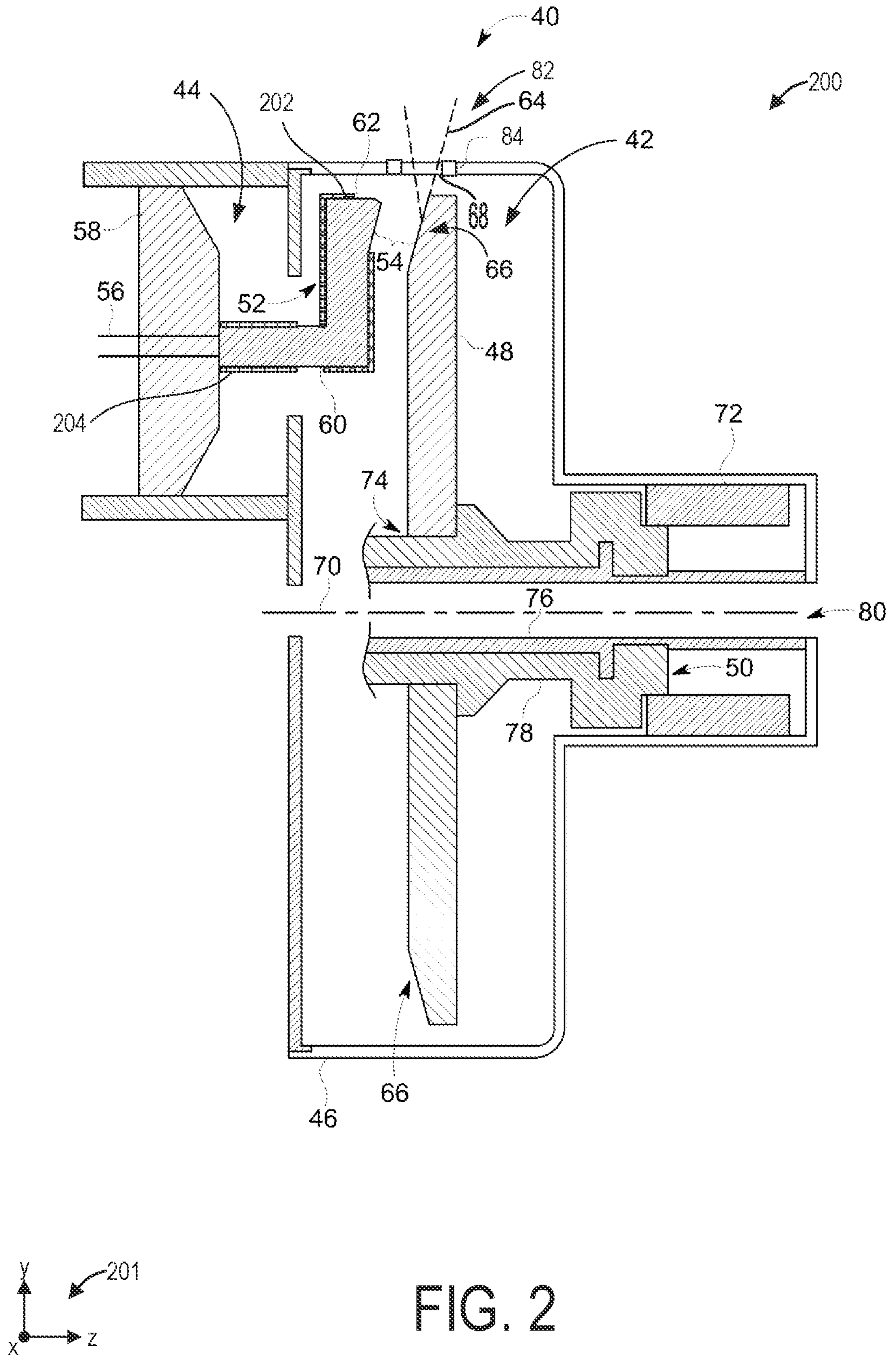
FIG. 2 shows a schematic of a cross-sectional view of a portion of an X-ray tube that may be included in the imaging system of FIG. 1.

The following description relates to various embodiments for a cathode of an X-ray tube. The X-ray tube may be included in an X-ray imaging system, an example block diagram of which is shown in FIG. 1. The X-ray imaging system may be an interventional radiography imaging system, a fluoroscopic imaging system, a mammography imaging system, a fixed or mobile radiography (RAD) imaging system, a tomographic imaging system, a computed tomography (CT) imaging system, and so on. The X-ray imaging system includes an X-ray source (e.g., the X-ray tube) to generate irradiating X-ray beams. A cross-sectional schematic view of an X-ray tube is shown in FIG. 2. The x-ray tube of FIG. 2 includes an anode assembly and a cathode assembly enclosed in an evacuated frame. The cathode assembly includes a cathode cup housing one or more filaments of the cathode, a lower extender that mechanically couples the cathode cup via electrical leads to a high voltage power supply, and a cathode shield, as is shown in further detail in FIGS. 3-10.

Figure 3:
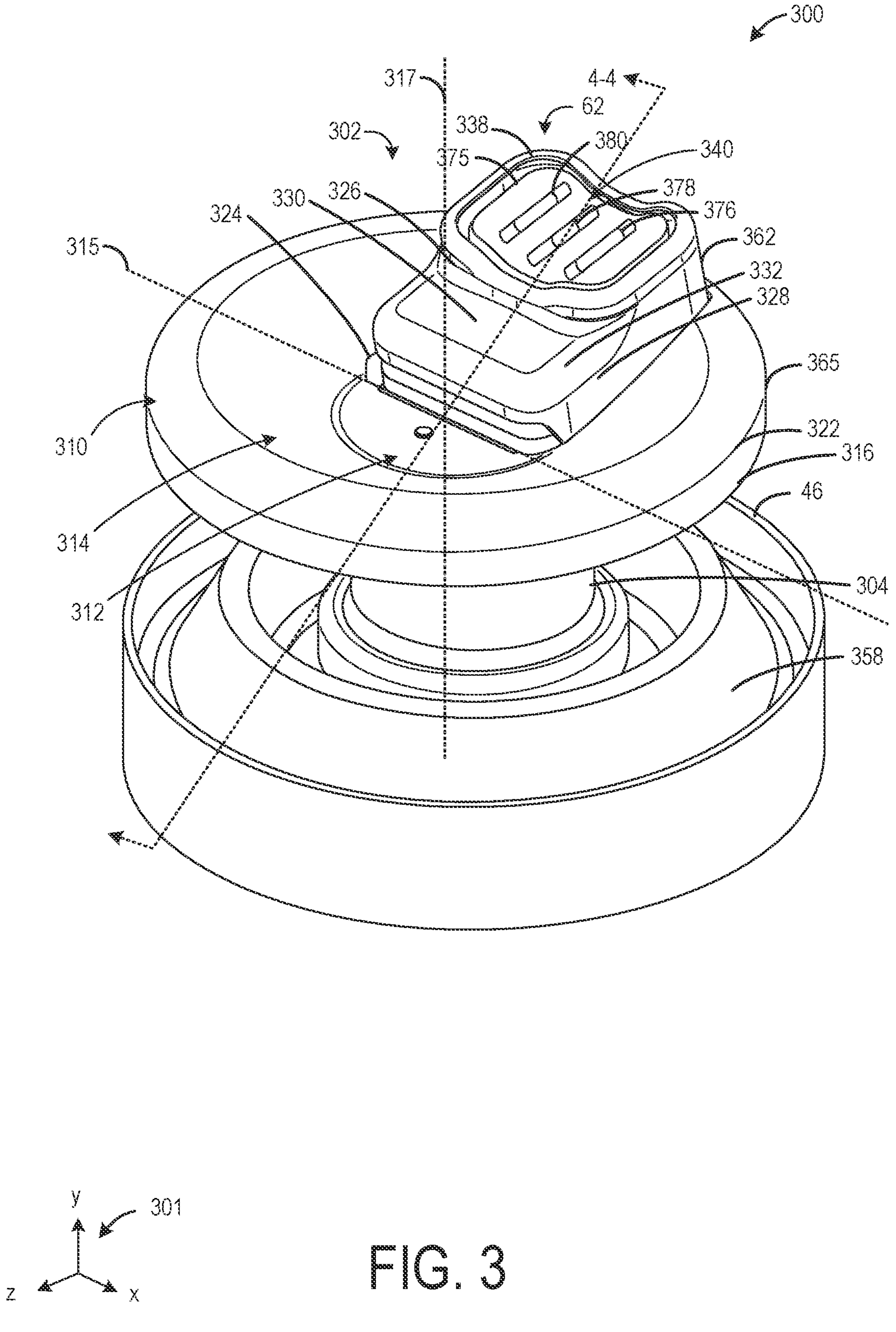
FIG. 3 shows a first perspective view of a cathode that may be included in the imaging system of FIG. 1.
Figure 4:
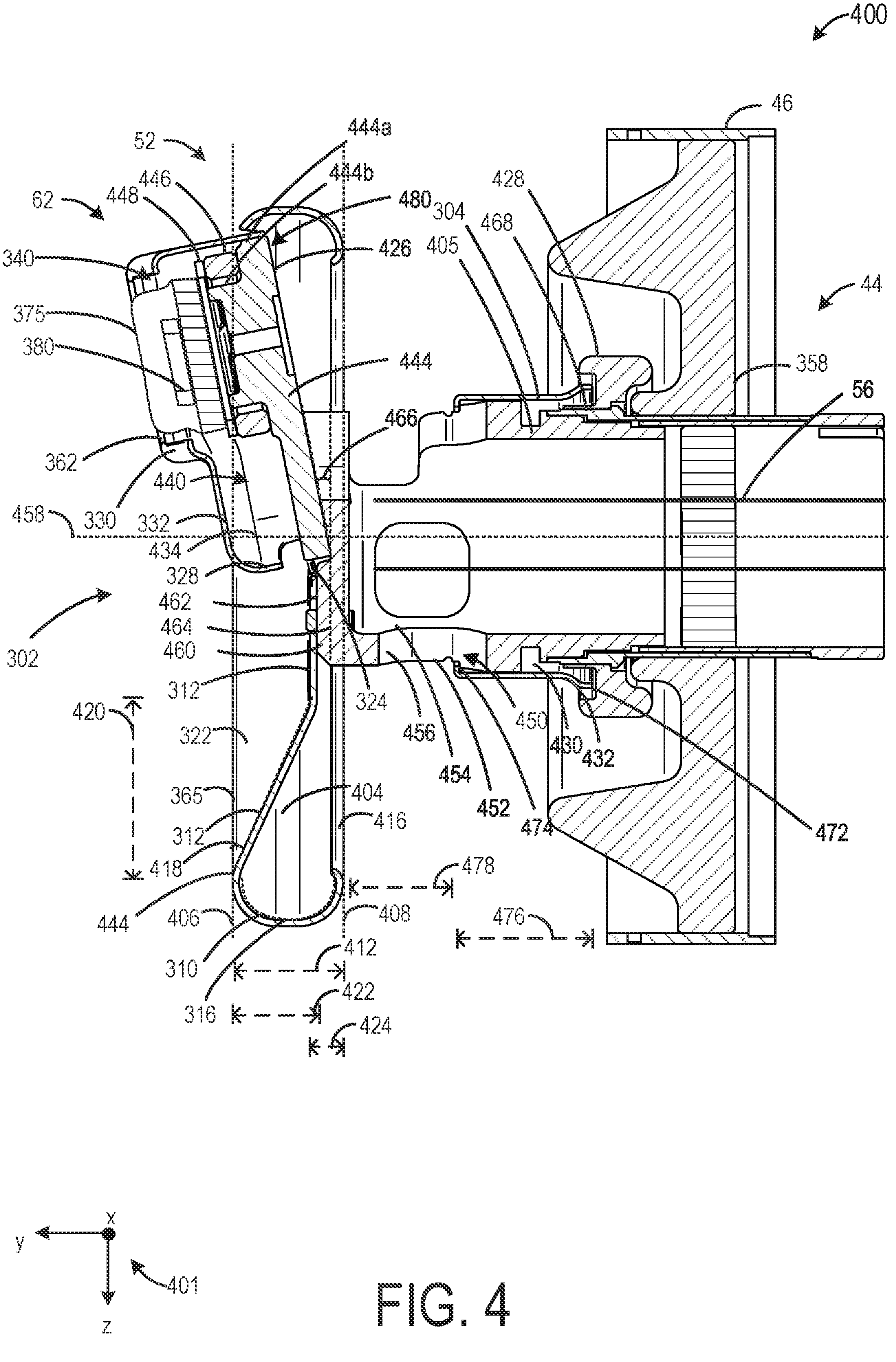
FIG. 4 shows a first cross-sectional view of the cathode of FIG. 3.
Figure 5:
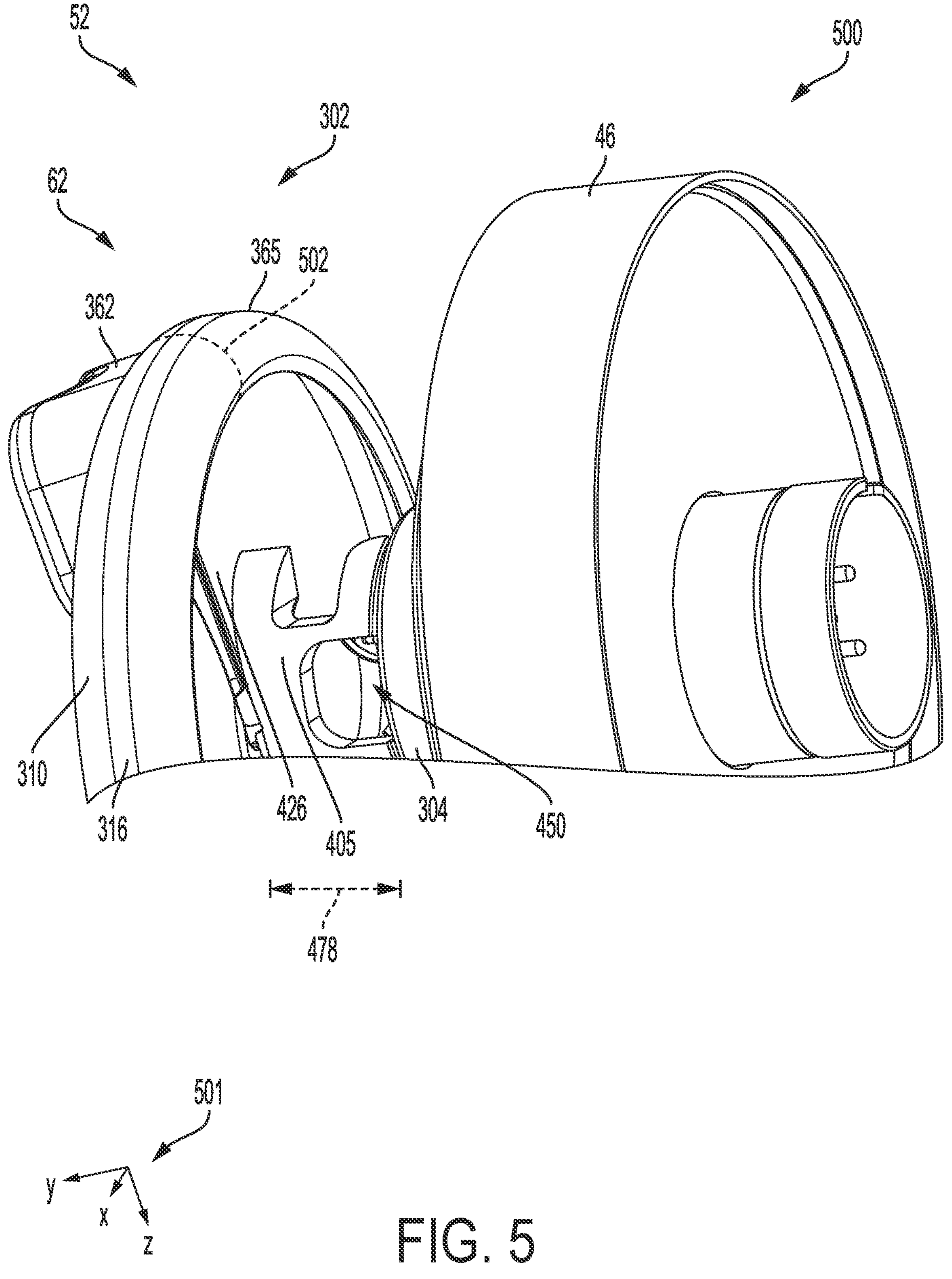
FIG. 5 show a second perspective view of the cathode of FIG. 3.
Figure 6:
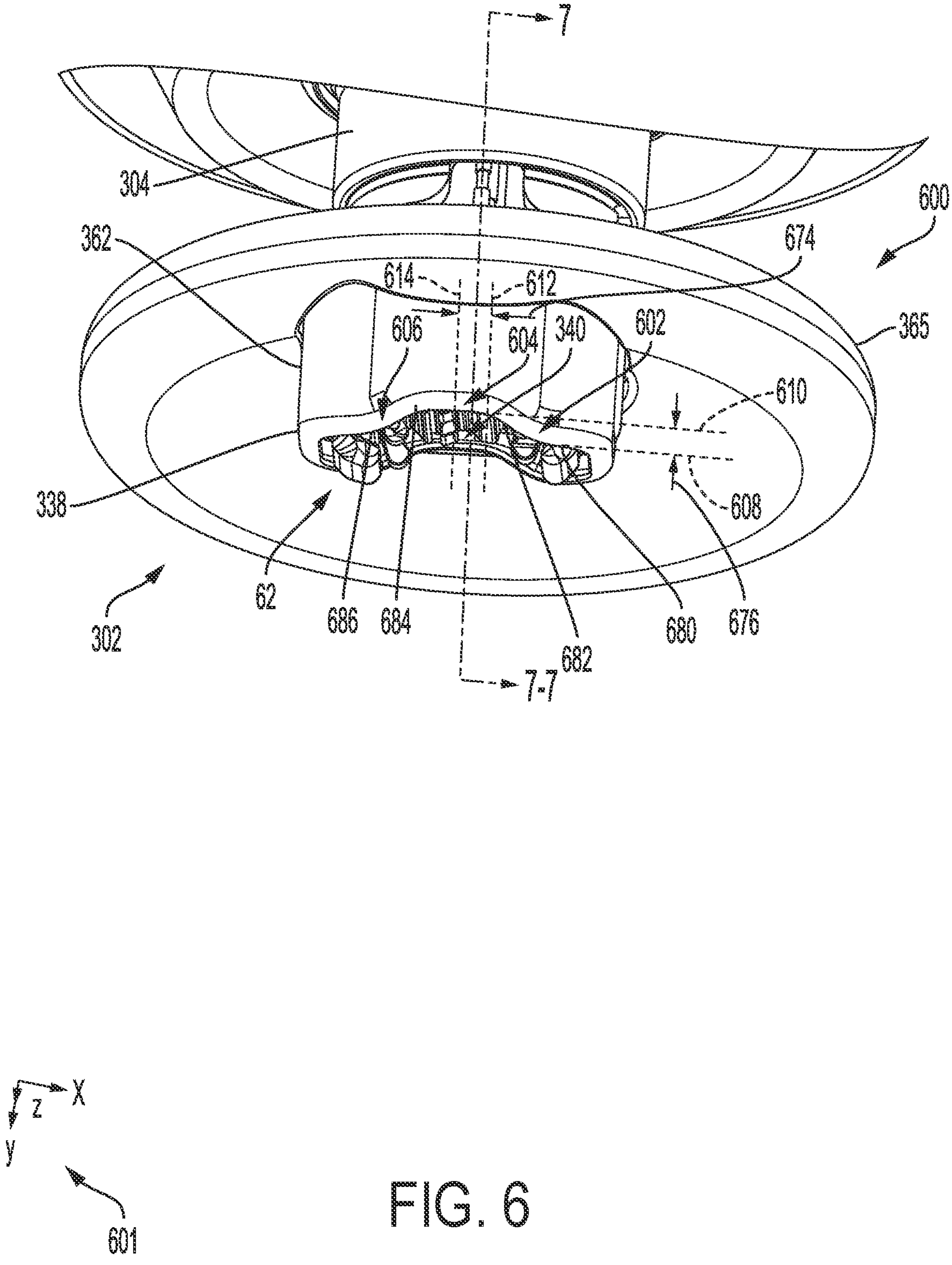
FIG. 6 shows a third perspective view of the cathode of FIG. 3.
Figure 7:
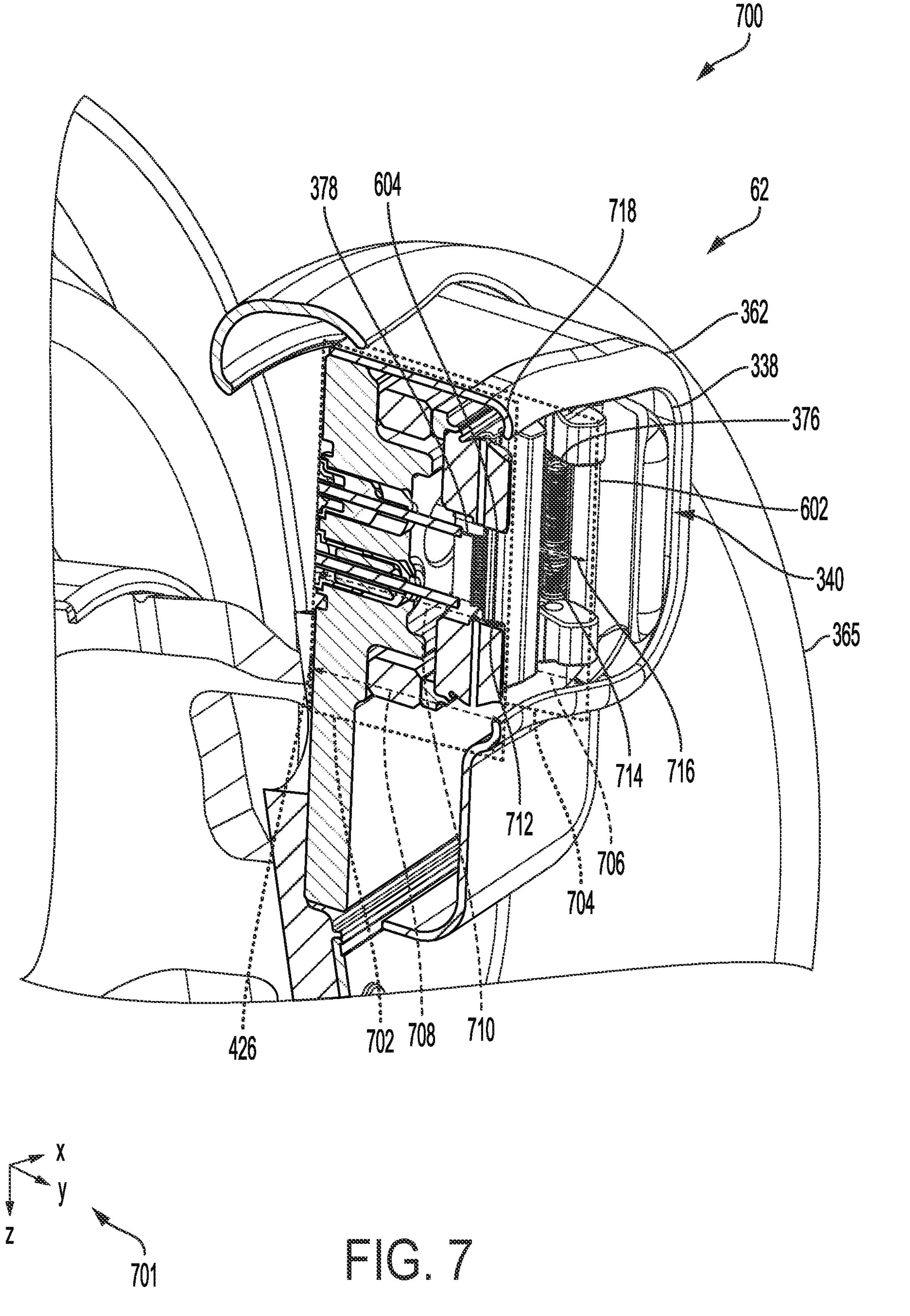
FIG. 7 shows a second cross-sectional view of the cathode of FIG. 3.
Figure 8:
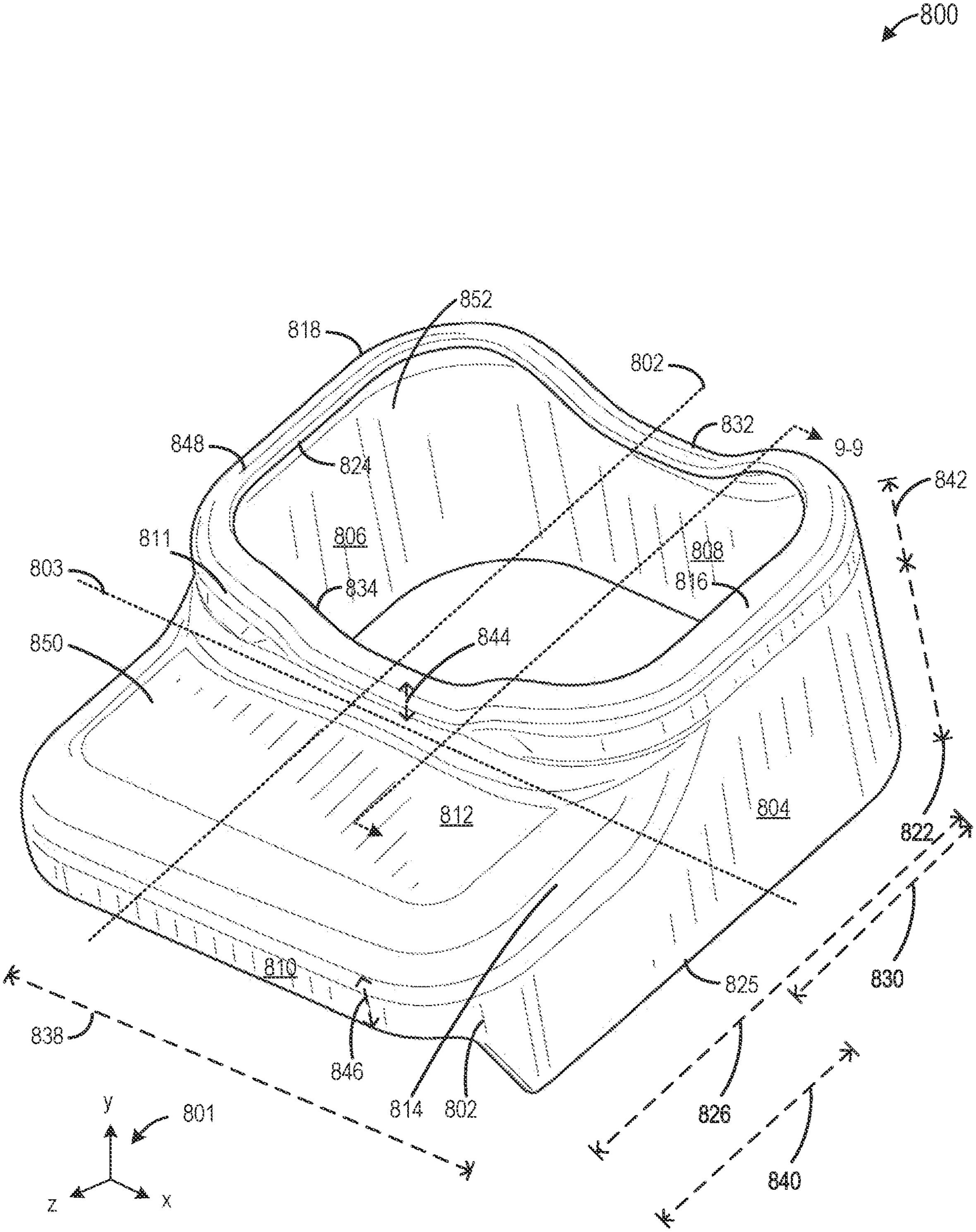
FIG. 8 shows a first example of a shield part that may be included in the cathode of FIG. 3.
Figure 9A:
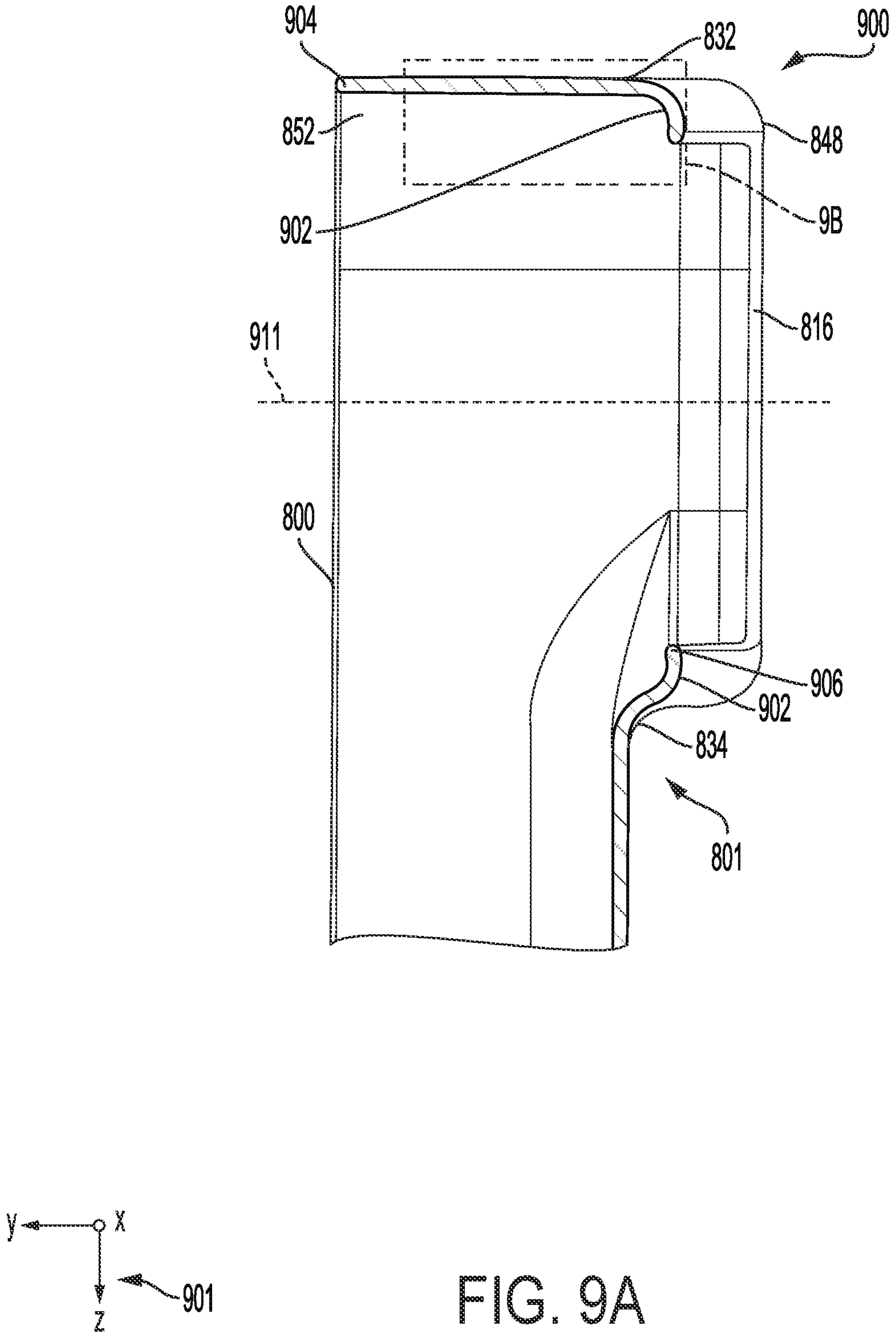
FIG. 9A shows a cross section of the first example of a shield part that may be included in the cathode of FIG. 3.
Figure 9B:
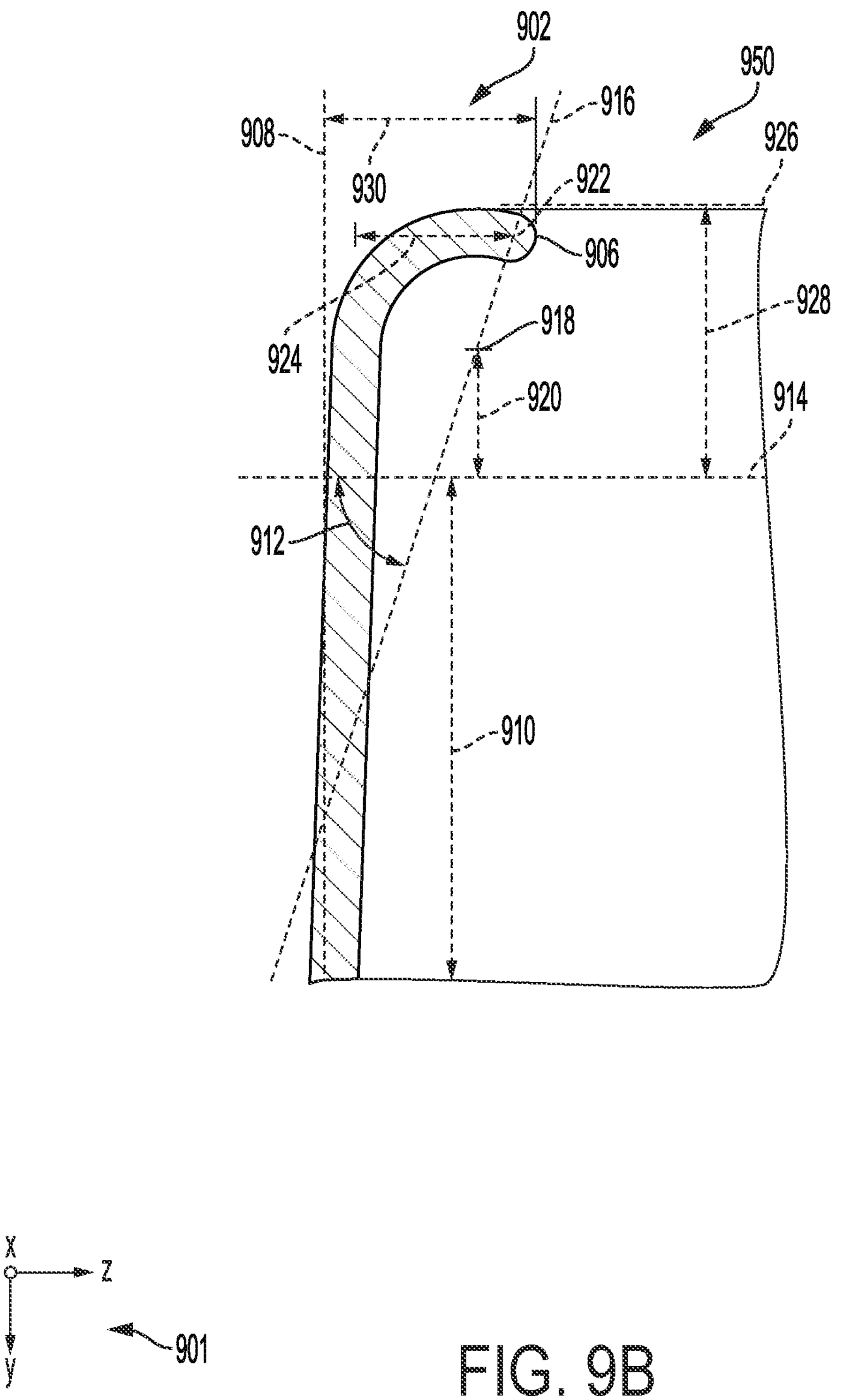
FIG. 9B shows an enlarged view of the cross section of the shield part illustrated in FIG. 9A.
Figure 10:
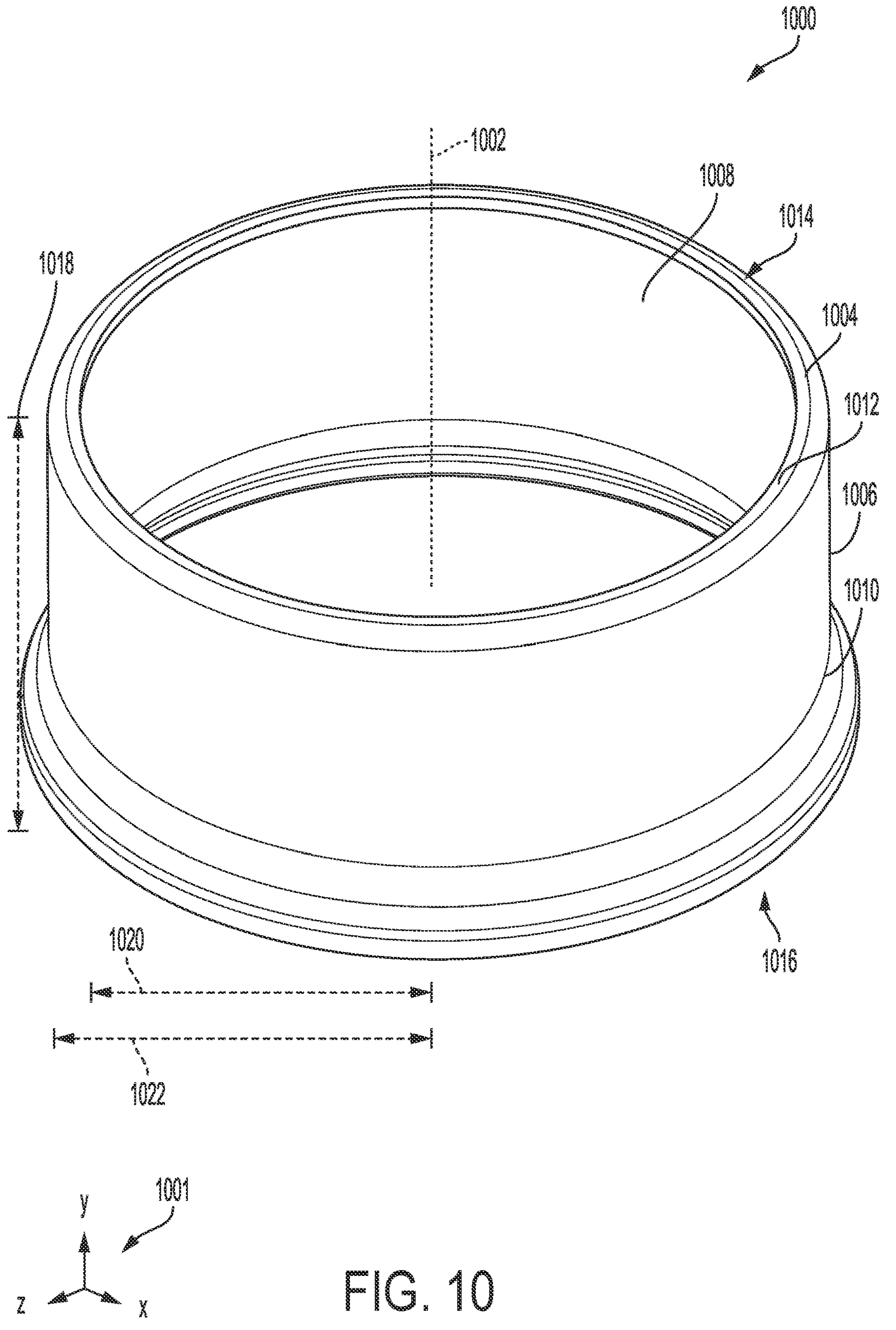
FIG. 10 shows a second example of a shield part that may be included in the cathode of FIG. 3.

FIG. 3 shows a perspective view of the cathode, including a shield assembly. FIG. 4 shows a cross section of the cathode, including a position and a shape of the shield parts comprising the shield assembly. The shield assembly includes a first shield part and a second shield part. The first part and the second shield part are spaced apart so that first shield part and the second shield part are not in direct physical contact. In one example, the first shield part includes a cathode mask and a disk shield and the second shield part surrounds a lower extender of the cathode. FIG. 5 shows a rear perspective view of the shield assembly, including unshielded portions of the cathode. The rear view shows a rear gap in the cathode shielding in an area of low electric field intensity that increases view factor to reduce overall cathode temperature. FIG. 6 shows a perspective view of the shield assembly including an exemplary focusing feature of the cathode mask. FIG. 7 shows a perspective cross-section of an example of the disclosed cathode shield assembly. FIG. 8 shows a perspective view of an example of the disclosed cathode shield. FIG. 9A shows a cross-section of an example of the disclosed cathode shield. FIG. 9B shows a detail of the cross section shown in FIG. 9A. FIG. 10 shows an example of the second shield that may surround the lower extender of the cathode. FIGS. 3-10 are shown approximately to scale although other relative dimensions may be used.

Smart cathodes may be used in imaging systems, such as X-ray imaging systems, to provide focusing to coiled filaments and create essentially infinite focal spot shape sizes with electrode features. Smart cathodes may be configured to provide a range of imaging services. For example, smart cathodes may be configured for diagnostic applications and interventional applications; the latter may include flowing current through the coiled filaments for a relatively longer time. Smart cathodes may include one or more coiled filaments, each coiled filament sized differently to provide a range of current suitable to the application. Typically, cathode-shielding elements are provided for maintaining high voltage stability and reducing a presence of electron emission field stress in undesirable locations. For example, a cathode assembly for a smart cathode may include a unitary cathode shield configured to prevent backscatter electrons from reaching electrical leads, the coiled filaments and focusing elements, and other field stress-sensitive components of the cathode assembly.

However, challenges exist with conventional smart cathode systems. For example, operating the cathode produces large amounts of heat. Cathode components, including, for example, ceramic insulation and electrical leads, are temperature sensitive and may have temperature thresholds above which the cathode components may degrade substantially. In some examples, there may be a tradeoff between cathode power density and maintaining an appropriate cathode temperature. Fully covered cathode shielding may exacerbate the challenge by concentrating waste heat around temperature sensitive components. Over time, heat stress may lead to component replacement or device decommissioning, increasing service time and operator costs. As another challenge, as smart cathodes may include one or more coiled filaments, without optimizing the cathode shielding to the size of each of the one or more coiled filaments, the electric field of one or more of the coiled filaments may be blocked and focusing power may be lost. Similarly, excessive field focusing may compromise image quality.

Thus, cathode shielding is disclosed herein to at least partly address the above-described issues. In one example, a cathode shield assembly comprises a first shield part and a second shield part, the first shield part and the second shield part spaced apart so that the first shield part and the second shield part are not in direct physical contact. In one example, the first shield part comprises a cathode mask and a disk shield and the second shield part surrounds a lower extender. A shaping of the disk shield blocks heat and high voltage produced by the target from reaching sensitive components, such as the ceramic insulation and electrical leads. The cathode mask shields cathode cup components such as bolts and welds, or other fastening mechanism for high voltage stability and focuses electrons emitted from one or more coiled filaments. The lower extender shield covers sensitive components such as electrical features and welds and permits radiation heat transfer via a gap spacing between the second shield part and the first shield part. Such a shield assembly ensures high voltage stability, but allows more radiation heat to be transferred directly to the frame. The increased radiation heat transfer lowers cathode component temperatures, and reduces amount of conduction heat transfer to the temperature sensitive components, such as the electrical leads and ceramic insulator. Heat reduction is particularly valued in interventional applications, which may have longer HVC reliability requirements and longer filament "on" time.

In another example, a shield for a cathode is disclosed comprising a cathode mask comprising a u-shaped central opening configured to receive a cathode cup, where a perimeter of the u-shaped central opening comprises a rolled over edge. In one example, a driver of the u-shape of the central opening of the disclosed cathode mask may be the maintenance of a similar difference (e.g., a roughly similar difference) between the rolled over edge and one or more coiled filaments arranged in the cathode cup. In one example, the rolled over edge is an end transition that may be tuned to reduce localized electron emission field stress on the end of the cathode mask. Such a shield has the advantages of increasing high voltage stability and increasing focusing field for a range of coiled filament sizes and strengths that may be included in a smart cathode.

A technical advantage of the herein disclosed shielding for a smart cathode includes enabling higher cathode tube power capability by increasing the heat transfer. Another technical advantage of the herein disclosed shield is increased electron focusing ability by tuning the perimeter of the cathode mask to the size of the coiled filament. Shaping of the disclosed shield parts additionally contributes to increased high voltage reliability. Commercial advantages include potentially lower cost tube due to increased power density and potential for enabling smaller packaging. Other advantages may include reduced service time and associated operator costs.

Before further discussion of the smart cathode system with a shield assembly having increased radiation heat transfer between the cathode and the frame and focusing features, an example imaging system in which the cathode may be implemented is shown. Turning now to FIG. 1, a block diagram is shown of an embodiment of an imaging system 10 configured both to acquire original image data and to process the image data for display and/or analysis in accordance with exemplary embodiments. It will be appreciated that various embodiments are applicable to numerous X-ray imaging systems implementing an X-ray tube, such as X-ray radiography (RAD) imaging systems, X-ray mammography imaging systems, fluoroscopic imaging systems, tomographic imaging systems, or CT imaging systems. The following discussion of the imaging system 10 is merely an example of one such implementation and is not intended to be limiting in terms of modality.

As shown in FIG. 1, imaging system 10 includes an X-ray device or X-ray source 12 configured to project a beam of X-rays 14 through an object 16. The object 16 may include a human subject, pieces of baggage, or other objects to be scanned. The X-ray source 12 may be conventional X-ray tubes producing X-rays 14 having a spectrum of energies that range, typically, from thirty keV to two hundred keV. The X-rays 14 pass through the object 16 and, after being attenuated, impinge upon a detector assembly 18. Each detector module in the detector assembly 18 produces an analog electrical signal that represents the intensity of an impinging X-ray beam, and hence the attenuated beam, as it passes through the object 16. In one embodiment, detector assembly 18 is a scintillator based detector assembly, however, it is also envisioned that direct-conversion type detectors (e.g., CdTe, CZT, Si detectors, etc.) may also be implemented.

A processor 20 receives the signals from the detector assembly 18 and generates an image corresponding to the object 16 being scanned. A computer 22 communicates with the processor 20 to enable an operator, using an operator console 24, to control the scanning parameters and to view the generated image. That is, the operator console 24 includes some form of operator interface, such as a keyboard, mouse, voice activated controller, or any other suitable input apparatus that allows an operator to control the imaging system 10 and view the reconstructed image or other data from the computer 22 on a display unit 26. Additionally, the operator console 24 allows an operator to store the generated image in a storage device 28 that may include hard drives, floppy discs, compact discs, etc. The operator may also use the operator console 24 to provide commands and instructions to the computer 22 for controlling a source controller 30 that provides power and timing signals to the X-ray source 12.

FIG. 2 illustrates a cross-sectional schematic view of an X-ray device or X-ray source 200 which may be included in the imaging system of FIG. 1. For example, the X-ray source 200 may be an exemplary embodiment of the X-ray source 12 of FIG. 1, formed of an X-ray tube 40 that includes an anode assembly 42, a cathode assembly 44, and a collector assembly 82. A set of reference axes 201 are provided for comparison between views shown, indicating an x-axis, a y-axis, and a z-axis. The X-ray tube 40 is supported by the anode assembly 42, the cathode assembly 44, and the collector assembly 82 within an envelope or frame 46, the frame housing at least a portion of the anode assembly 42, the cathode assembly 44, and the collector assembly 82. The frame 46 houses an anode 48 with a target 66, a bearing assembly 50, and a cathode 52. The frame 46 defines an area of relatively low pressure (e.g., a vacuum) compared to ambient, in which high voltages may be present. Further, the frame 46 may be positioned within a casing (not shown) filled with a cooling medium, such as oil, that may also provide high voltage insulation. While the anode 48 configured with the target 66 is described above as being a common component of the X-ray tube 40, the anode 48 and target 66 may be separate components in alternative X-ray tube embodiments.

In operation, an electron beam is produced by the cathode assembly 44. In particular, the cathode 52 receives one or more electrical signals via a series of electrical leads 56. The electrical beam occupies a space 54 between the cathode 52 and the target 66 of the anode 48. The electrical signals may be timing/control signals that cause the cathode 52 to emit the electron beam at one or more energies and at one or more frequencies. The electrical signals may also at least partially control the potential between the cathode 52 and the anode 48. Cathode 52 includes a central insulating shell 58 from which a mask 60 extends. Mask 60 encloses electrical leads 56, which extend to a cathode cup 62 mounted at the end of mask 60. In some examples, cathode cup 62 serves as an electrostatic lens that focuses electrons emitted from a filament within cathode cup 62 to form the electron beam.

Exterior surfaces of the cathode 52, e.g., surfaces of the mask 60 and the cathode cup 62, are covered in shielding that can tolerate higher field stresses between the high potentials of the cathode 52 and the ground plane of the frame 46. In one example, the shielding includes a first shield part 202 and a second shield part 204. In the example, the first shield part 202 and the second shield part 204 are spaced apart and not in direct physical contact. In one example, the first shield part 202 may include a disk shield and a cathode mask and the second shield part 204 may surround the mask 60. Examples of first shield part 202 and the second shield part 204 are shown in more detail with reference to FIGS. 3-10. In one example, as illustrated in the schematic view of the X-ray source 200, the first shield part 202 is an integrally formed, single continuous member. For example, there may be no welding or seams joining the disk shield and the cathode mask comprising the first shield part 202. Rather, the first shield part 202 may be monolithic structure. In other examples, the disk shield and the cathode mask comprising the first shield part 202 may be formed separately and welded to the cathode assembly.

X-rays 64 are produced when high-speed electrons of the electron beam are suddenly decelerated when directed from the cathode 52 to the target 66 formed on the anode 48 via a potential difference therebetween of, for example, sixty thousand (60,000) volts or more in the case of CT applications. The collector assembly 82 may include an electron collector 84 and a window 68, through which X-rays 64 generated by the anode assembly 42 are emitted. The electron collector 84 may hold the window 68 in place in the frame 46 and may further absorb backscatter electrons. The X-rays 64 are emitted through window 68 formed in the frame 46 toward a detector array, such as the detector assembly 18 of FIG. 1.

Anode assembly 42 includes a rotor 72 and a stator (not shown) located outside the X-ray tube 40 and surrounding the rotor 72 for causing rotation of the anode 48 during operation. The anode 48 is supported for rotation by a bearing arm or a bearing assembly 50, which, when rotated, also causes the anode 48 to rotate about a centerline 70 thereof. As such, the centerline 70 defines a rotational axis of the anode 48 and the bearing assembly 50. As shown, the anode 48 has an annular shape, which contains a circular opening 74 in the center thereof for receiving the bearing assembly 50.

The anode 48 may be manufactured to include a number of metals or alloys, such as tungsten, molybdenum, copper, or any material that contributes to bremsstrahlung (e.g., deceleration radiation) when bombarded with electrons. The target 66 of the anode 48 may be selected to have a relatively high refractory value so as to withstand the heat generated by electrons impacting the anode 48. Further, the space between the cathode assembly 44 and the anode 48 may be evacuated in order to minimize electron collisions with other atoms and to maximize an electric potential.

To avoid overheating of the anode 48 when bombarded by the electrons, the rotor 72 rotates the anode 48 at a high rate of speed (e.g., 90 to 250 Hz) about the centerline 70. In addition to the rotation of the anode 48 within the frame 46, in a CT application, the X-ray tube 40 as a whole is caused to rotate about an object, such as the object 16 of the imaging system 10 in FIG. 1, at rates of typically 1 Hz or faster.

Different embodiments of the bearing assembly 50 can be formed, such as with a number of suitable ball bearings, but in the illustrated exemplary embodiment comprises a liquid metal hydrodynamic bearing having adequate load-bearing capability and acceptable acoustic noise levels for operation within the imaging system 10 of FIG. 1.

In general, the bearing assembly 50 includes a stationary component, such as a center shaft 76, and a rotating portion, such as a sleeve 78 to which the anode 48 is attached. While the center shaft 76 is described with respect to FIG. 2 as the stationary component of the bearing assembly 50 and the sleeve 78 is described as the rotating component of the bearing assembly 50, embodiments of the present disclosure are also applicable to embodiments wherein the center shaft 76 is a rotary shaft and the sleeve 78 is a stationary component. In such a configuration, the anode 48 would rotate as the center shaft 76 rotates.

The center shaft 76 may optionally include a cavity or coolant flow path 80 though which a coolant (not shown), such as oil, may flow to cool bearing assembly 50. As such, the coolant enables heat generated from the anode 48 of the X-ray tube 40 to be extracted therefrom and transferred external from the X-ray tube 40. In straddle mounted X-ray tube configurations, the coolant flow path 80 extends along a longitudinal length of the X-ray tube 40, e.g., along the centerline 70. In alternative embodiments, the coolant flow path 80 may extend through only a portion of the X-ray tube 40, such as in configurations where the X-ray tube 40 is cantilevered when placed in an imaging system.

As described above, cathode shielding is desired that maintains high voltage stability, increases heat transfer to the frame, and electron field focusing optimized for one or more coiled filaments of different strengths. The herein described shielding may have increased high-voltage stability and increased useable lifetime compared to a conventional smart cathode. In one example, a cathode shield assembly includes a first shield part and a second shield part, the first and second shield parts spaced apart so that the first shield part and the second shield part are not in direct physical contact.

Such cathode shielding shields high field stress areas while increasing radiative heat transfer from cathode areas having low field stress and high heat sensitivity. In one example, the first shield part comprises a cathode mask and a disk shield and the second shield part surrounds a lower extender of the cathode. In one example, the disk shield is a substantially concave disk having a curved lip and a cutout through which a portion of the cathode (e.g., a cathode cup) protrudes. The cutout may be a substantially rectangular cutout offset from a center of the disk shield. The cathode mask comprises a u-shaped central opening configured to receive the cathode cup. In one example, a perimeter of the u-shaped central opening comprises a rolled over edge. The u-shaped central opening may comprise a bend of multiple radii shaped for focusing the one or more coiled filaments of the cathode. The rolled over edge may comprise a bend angle that is shaped for reducing field stress on the perimeter of the central opening.

A position and shape of the shield parts contribute to high voltage stability while increasing view factor in areas having low electron emission field stresses, and balance optics and electro-statics. For example, the shape of the first shield part focuses field stresses on the shield OD allowing for exposing lower field stress portions of the cathode via gap spacing between the first shield part and the second shield part. The herein described system may thus result in a cathode with reduced cathode component temperatures compared to conventional cathodes having fully covered shielding, increased high voltage stability, and increased image quality due to tuned field focusing. A useable life of the cathode may thus be relatively increased and part replacement and service time may be decreased.

FIG. 3 illustrates a perspective view of a cathode assembly 300, which may be an embodiment of the cathode assembly 44 of FIG. 2. Elements of the cathode assembly 300 which are equivalent to elements of the X-ray tube 40 of FIG. 2 are similarly numbered. A set of reference axes 301 are provided for comparison between views shown, indicating an x-axis, a y-axis, and a z-axis. The x-axis may be referred to as a lateral axis, the z-axis may be referred to as a vertical axis, and the y-axis may be referred to as a longitudinal axis.

As described above, the cathode assembly 300 emits electrons from a cathode that are received by an anode assembly (e.g., anode assembly 42 in FIG. 2) to generate X-rays. The cathode assembly 300 may include a major insulator 358, a lower extender 405 (see FIG. 4), and cathode 52 including cathode cup 62. The major insulator 358 may be equivalent to the central insulating shell 58, and the lower extender 405 may be equivalent to the mask 60, such as described with reference to FIG. 3.

The cathode cup 62 may include a focusing element and one or more coiled filaments. In one example, the focusing element may be a single continuous architecture with at least one channel sized such that a thermionic filament may be positioned therein, and with at least one focusing feature on either lateral side of the at least one channel. In one example, focusing features and channels of the focusing element may have rounded corners and edges, and smooth geometry, as opposed to corners that meet at a linear angle. In one example, the focusing element may comprise more than one coiled filament. In the example shown, a focusing element 375, shown simplified in FIGS. 3-4 and in more detail in FIGS. 6-7, may be configured as a continuous single architecture (e.g., a monolithic structure) gridding electrode with electron emitting filaments positioned in each of at least three channels with geometry to focus emitted electrons into a single electron beam. The focusing element 375 incorporates a first filament 376, a second filament 378, and a third filament 380. A spacing between the three filaments may be adjusted based on the size and strength of each of the filaments. In one example, the focusing element 375 has a substantially rectangular shape (e.g., looking down the y-axis) to accommodate the spacing between the three filaments. The focusing element 375 may have a u-shape or bowl shape (e.g., looking down the z-axis), such that the sides of the focusing element may have a taller height compared to a center of the focusing element. As previously described in reference to FIG. 2, the cathode assembly 300 may provide electrons to the target (e.g., the target 66 in FIG. 2) at varying energy levels from each of the one or more coiled filaments. The cathode cup 62 is partially enclosed by a cathode shield assembly.

In one example, the cathode shield assembly comprises a first shield part 302 and a second shield part 304, the first shield part 302 spaced apart from the second shield part 304 such that the first shield part 302 and the second shield part 304 are not in contact. The first shield part 302 may be the same or similar to first shield part 202 and the second shield part 304 may be the same or similar to the second shield part 204, described with reference in FIG. 2. The first shield part 302 and the second shield part 304 may be spaced apart by a gap spacing between the first shield part 302 and the second shield part 304, which is described with reference to FIG. 4 below. As will be elaborated in further detail below, the first shield part 302 has a disk shield 365 and a cathode mask 362. The second shield part 304 surrounds the lower extender 405. The second shield part 304 may be ring shaped. In one example, the disk shield 365 includes a cutout or opening for receiving the cathode cup 62, a portion of which is securely mechanically coupled to the lower extender 405. The cathode cup 62 is partially enclosed by the cathode mask 362. The first shield part 302 and the second shield part 304 may work together to shield components of the cathode 52, such as filaments, focusing elements, and electrical leads, from high temperatures and backscatter electrons to provide high voltage stability while at the same time increase radiative heat transfer to the frame 46.

The disk shield 365 may be substantially concave and substantially disk shaped. The disk shield 365 may have a first outer face 322. The first outer face 322 may include a curved lip 310, a planar area 312, and a sloped transition 314 between the curved lip 310 and the planar area 312. In one example, the curved lip 310 and sloped transition 314 descend downward, with respect to the z-axis, toward the planar area 312. The curved lip 310 may also descend downward, with respect to the z-axis, forming a surface 316. The surface 316 may is a part of the curved lip 310 and may extend radially about a central axis 317. The first outer face 322 may be centered about the central axis 317. In one example, the disk shield 365 may include a first cutout that may be defined by an opening on the first outer face 322, an opening on a first inner face 404 (sec FIG. 4) and a first cutout surface 324. In one example, the first cutout may be is a substantially rectangular cutout offset from a center of the disk shield 365. For example, the first cutout may be above a first centerline 315 longitudinally bisecting the cathode assembly 300. The shape of the disk shield 365 is described in more detail below with reference to FIGS. 4-7.

In one example, the cathode cup 62 may protrude through the first cutout and the cathode mask 362 may receive the cathode cup 62. The cathode mask 362 may comprise a substantially prismatic shape having a rectangular extension 326. The cathode mask 362 includes a second outer face 330 and a second inner face 434 (see FIG. 4). In one example, the second outer face 330 and the first outer face 322 form a continuous, integral surface of the first shield part 302. In one example, the substantially prismatic shape and rectangular extension 326 comprise a plurality of sidewalls 328 arranged perpendicularly to a front panel 332, the sidewalls 328 and the front panel 332 meeting at no sharp edges. In other words, the cathode mask shape has rounded edges at transitions between the sidewalls, the front panel, and the rectangular extension. The cathode mask 362 has a central opening 340 that may defined by an opening on the second outer face 330, an opening on the second inner face 434 (see FIG. 4), and a lip or perimeter 338.

In one example, the cathode mask 362 is shaped to accommodate the focusing element 375 and coiled filaments of the cathode cup 62. For example, the rectangular extension 326 frames the focusing element 375. The cathode mask 362 may be shaped to maintain a similar distance between each coiled filament of a plurality of coiled filaments (e.g., such as the first filament 376, the second filament 378, and the third filament 380) arranged in the focusing element 375 and the perimeter 338 of the central opening 340. In one example, the central opening 340 may comprise a u-shape (e.g., looking down the z-axis) and the perimeter 338 may comprise a rolled over edge. The u-shape and rolled over edge are examples of focusing features of the cathode mask 362 that may be tuned to balance optics and electro-statics. The shape and focusing features of the cathode mask 362 are described in more detail below with reference to FIGS. 4-9B.

FIG. 4 shows a cross-sectional view 400 of the cathode assembly 300 of FIG. 3, as defined by a lateral cut taken along a dashed line 4-4 in FIG. 3. Like components are numbered similarly as in FIG. 3. A set of reference axes 401 are provided for comparison between views shown, indicating an x-axis, a y-axis, and a z-axis.

The cross-sectional view 400 shows the cathode cup 62, the major insulator 358, the lower extender 405, and the cathode shield including the first shield part 302 and the second shield part 304 partially enclosing the cathode 52. The cathode cup 62 includes a plurality of electrical leads (not shown). The lower extender 405 couples the cathode cup 62 to the major insulator 358 and encloses a plurality of high voltage cables 56 (shown schematically). The plurality of high voltage cables 56 couple the plurality of electrical leads to a high voltage power supply. The disk shield 365 may be coupled to a face 462 of the lower extender 405, the cathode mask 362 may be coupled to and partially shield the cathode cup 62, and the second shield part 304 may form a sleeve or ring around the lower extender 405.

The cathode cup 62 may further comprise a base 444, an insulator 446, and a weld pad 448. The cathode cup 62 may include one or more braze foils, which may be used to couple (e.g., via brazing) the insulator 446 to the base 444 and to the weld pad 448, respectively. In one example, the insulator 446 may be a ceramic insulator (e.g., formed of ceramic). In other examples, the insulator 446 may be formed of material that sufficiently insulates the base 444 from the weld pad 448. The insulator 446 may have a rectangular ring shape with a hollow center. For example, the insulator 446 may have a rectangular shape with curved edges and a rectangular cutout with curved edges in a center of the insulator 446. The base 444 may be formed of a metal such as, for example, nickel, steel, Kovar, or Niobium, and may have a continuous, stepped architecture including a first level 444*a* and a second level 444*b*. The plurality of electrical leads couple to a rear face 426 of the base 444. The weld pad 448 may be ring shaped with rounded corners connecting straight edges and a hollow center. Similarly, the weld pad 448 may be formed of a metal such as, for example, nickel, steel, Kovar, or Niobium. The ring-like structures of the insulator 446 and the weld pad 448 may allow the second level 444*b* of the base 444 to protrude through the centers of the insulator 446, and the weld pad 448. The insulator 446 may circumferentially surround the second level 444*b* of the base 444.

The weld pad 448, the base 444, the braze foils, and the insulator 446 may be brazed together using torch brazing, induction brazing, resistance brazing, or another brazing method wherein the weld pad 448, the base 444, and the insulator are joined by a filler metal (e.g., braze foils). For example, the filler metal may be used to couple the insulator to the base 444 and the weld pad 448 via brazing.

In one example, the base 444 of the cathode cup 62 may couple to a mount wall 460 of the lower extender 405 at a tilt. For example, the mount wall 460 of the lower extender 405 may be arranged approximately perpendicular to a second centerline 458. The second centerline 458 may be approximately collinear or formed from the central axis 317. The second centerline 458 longitudinally bisects the cathode assembly 300. A second dashed line 464 indicates the approximate perpendicularity of the mount wall 460. The rear face 426 of the cathode cup 62 may tilt at a tilt angle 466 relative to the second dashed line 464. In one example, the cathode cup 62 and the lower extender 405 have a tolerance to control the tilt angle to +/−0.25°.

In one example, the lower extender 405 may include one or more windows 450 defined by an opening on a lower extender exterior surface 452, an opening on a lower extender interior surface 454, and a lower extender window surface 456. The windows 450 may contribute to cooling cathode components, such as the plurality of electrical leads (e.g., ribbons, wires, cables, pins or other electrical connection components) arranged on the rear face 426 of the cathode cup coupling the one or more of coiled filaments, e.g., third filament 380, housed in the cathode cup 62 to the high voltage cables 56. A sleeve component 468 may be interposed between the lower extender 405 and the minor insulator 428.

In the example shown, the disk shield 365 has an outer dimension 406 and an inner dimension 408. A distance between the outer dimension 406 and the inner dimension 408 may define a disk shield width 412 relative the y-axis. The curved lip 310 may define an arcuate surface integral with the disk shield 365. The curved lip 310 extends between the outer dimension 406 and a periphery 416 of the disk shield 365. The curved lip 310 may have multiple points of inflection taken on the cross-sectional view 400 taken on line 4-4. A point of inflection may be located on surface 316, wherein the curved lip 310 may curve toward the outer dimension 406 or periphery. Another point of inflection may be located near the outer dimension 406, where the curved lip 310 may curve in the direction of the periphery 416 and form into the sloped transition 314. Another point of inflection may be located near the periphery 416, where the curved lip 310 may curve in the direction of the outer dimension 406. After curving at the aforementioned point of inflection, the curved lip 310 may terminate at a region axially between the outer dimension 406 and periphery 416 and extend radially about the second centerline 458. The aforementioned points of inflection may be mirrored on the section of curved lip 310 opposite the second centerline 458. The aforementioned points of inflection may be part of rings or other functions of inflection that may be located radially about the second centerline 458 when projected into three-dimensional space of the curved lip 310.

The sloped transition 314 extends between the outer dimension 406 and the planar area 312. The sloped transition 314 slopes at a slope angle 418 for an axial length 420 over a radial change 422. The planar area 312 is offset from the inner dimension 408 by a first offset 424. In one example, the disk shield 365 may be welded to the lower extender 405. For example, the planar area 312 may be laser welded to the face 462 of the mount wall 460.

In one example, the cathode cup 62 protrudes through the first cutout of the disk shield 365. The cathode mask 362 is configured to receive the cathode cup 62. The central opening 340 is arranged opposite from an open side 480 of the cathode mask 362. The cathode cup 62 may be received through the open side 480. In one example, the second inner face 434 may make face-sharing contact with the base 444 of the cathode cup 62 and an air gap 440 may be captured between the second inner face 434 and the focusing element 375, the insulator 446, and the weld pad 448 of the cathode cup 62. In one example, the cathode mask 362 may be welded to the cathode cup 62. For example, the cathode mask 362 may be laser welded to the base 444. The focusing element 375 of the cathode cup 62 may be partially exposed via the central opening 340 of the cathode mask 362, the plurality of sidewalls 328 and the perimeter 338 framing the focusing element 375 and filaments arranged therein, e.g., third filament 380. The rear face 426 of the cathode cup 62 may be exposed (or partially exposed) by the open side 480 of the cathode mask 362. The curved lip 310 of the disk shield 365 may partially shield the rear face 426 of the cathode cup 62. For example, the curved lip 310 may shield a portion of the rear face 426 having high electric field intensity, e.g., near the contact between the cathode mask 362 and the first level 444*a*.

The shape of the first shield part 302 focuses field stress on the first outer face 322 and the second outer face 330, blocking heat generated at the target of the anode (e.g., target 66 of anode 48 in FIG. 2) from reaching temperature-sensitive components including, for example, the major insulator 358, minor insulator 428, and the plurality of electrical leads. The first shield part 302 also increases high voltage stability. For example, the cathode mask 362 contributes to high voltage stability by shielding the welds (e.g., the weld pad 448), brazes, fasteners, or other type of fastening mechanism comprising the cathode cup 62. Additionally, the shape, by having rounded, smooth transitions between the plurality of sidewalls 328 and the front panel 332, contributes to high voltage stability. In addition, a shaping of the central opening 340 may reduce field stress on the end of the cathode mask 362 and increase the focusing field of the coiled filaments, which is discussed in more detail below. As another example, the shape of the disk shield 365 contributes to high voltage stability. For example, the sloped transition 314 into the curved lip 310, by being a smooth transition without sharp corners, reduces field stress on the periphery 416. For example, by shielding temperature sensitive components with the first shield part 302, the rear face 426 of the cathode cup 62 may be exposed, e.g., unshielded. The open side 480 of the cathode mask 362 allows more radiation heat to be transferred from the cathode cup 62 to the frame 46 without compromising high voltage stability.

By focusing field stress on the first outer face 322 and the second outer face 330 of the first shield part 302 and blocking temperature-sensitive components from exposure to high temperatures generated at the anode, the disclosed cathode shield at the same time may expose portions of the cathode 52 that are traditionally enclosed. For example, the disclosed cathode shield exposes portions of the cathode 52 having low electric field intensity, high temperature, and view factor to the frame 46. Such selective shielding may substantially lower cathode component temperatures and reduce an amount of conduction heat transfer to the plurality of high voltage cables 56. The first shield part 302 is described in more detail below.

The second shield part 304 is an open cylinder or ring shaped member surrounding the lower extender 405. The second shield part 304 has a ring interior surface 430 and a ring exterior surface 432. In one example, the ring interior surface 430 makes face sharing contact with the lower extender exterior surface 452. In one example, second shield part 304 may be welded to the lower extender exterior surface 452. In one example, the second shield part 304 may have a flared lip 472 on a first circular opening and a flat rim 474 on an opposing, second circular opening. The flared lip 472 may abut the minor insulator 428. In one example, the second shield part 304 may have a third length 476 relative to the y-axis. In one example, the second shield part 304 may be spaced apart from the first shield part 302 by a gap spacing 478 relative to the y-axis. The third length 476 and gap spacing 478 may be axial relative to the second centerline 458.

In one example, the second shield part 304 is shaped to shield components housed within the lower extender 405 that would otherwise increase high voltage instability while allowing for as much radiative heat transfer. For example, the third length 476 of the second shield part 304 and the gap spacing 478 may be optimized to balance covering welding, proximity to ground, temperature of the cathode components, and view factor to the frame 46. In one example, the gap spacing 478 may be 25 to 30 mm. The second shield part 304 is described in more detail below.

In one example, the disk shield 365 and the cathode mask 362 of the first shield part 302 are an integrally formed, single continuous member, such as described with reference to FIG. 2. In another example, the disk shield 365 and the cathode mask 362 are formed as separate pieces. The first shield part 302 and the second shield part 304 may be formed of a metal such as, for example, nickel, steel, Kovar, or Niobium. Shield surfaces may be have an electro-polish finish. In one example, the first shield part 302 and the second shield part 304 may be nickel and the first outer face 322, the second outer face 330, and the ring interior surface 430 may be electro-polished nickel.

FIG. 5 shows a rear view 500 of the cathode assembly 300 of FIG. 3. Like components are numbered similarly as in FIG. 3 and include the first shield part 302, the second shield part 304, the cathode cup 62, and the frame 46. A set of reference axes 501 are provided for comparison between views shown, indicating an x-axis, a y-axis, and a z-axis.

A position and shape of the first shield part 302 and the second shield part 304 creates low field stresses in open view factor areas. For example, dotted line 502 indicates a curvature of the first shield part 302 that shields a high field stress area of the cathode cup 62. In one example, the curvature and high-polish nickel surface may shield an electric field intensity as high as $1*10^7$ volts per meter (V/m). Unshielded areas of the rear face 426 and the gap spacing 478 may have substantially lower electric field intensity, for example, ranging from 0 to $2.5*10^6$ V/m. In one example, unshielded areas of the rear face 426 and the gap spacing 478 may have a view factor to the frame 46 ranging from 0.4 to 0.7 emissivity. In one example, the first shield part 302 and the second shield part 304 expose a portion of the cathode cup 62 having an electric field stress intensity less than a threshold intensity (e.g., less than $2.5*10^6$ V/m) and a view factor to the frame greater than a threshold emissivity (e.g., more than 0.4 emissivity).

The open sections of the shield increase view factor and corresponding radiation heat transfer from the cathode 52 to the frame 46. In addition, the gap spacing 478 between the second shield part 304 and the first shield part 302 increases component cooling by leaving unshielded the windows 450 of the lower extender 405. As a result, an overall temperature of the cathode is reduced. For example, high temperature-sensitive components, such as the plurality electrical leads (not shown) conducting current to the coiled filaments, and the cathode cup insulator (e.g., insulator 446 in FIG. 4), may experience substantial temperature reduction and increased in component reliability.

FIG. 6 shows a front view 600 of the cathode assembly 300 of FIG. 3. Like components are numbered similarly as in FIG. 3 and include the cathode mask 362 and the disk shield 365 comprising the first shield part 302, the cathode cup 62, and the second shield part 304. A set of reference axes 601 are provided for comparison between views shown, indicating an x-axis, a y-axis, and a z-axis.

In one example, the cathode cup 62 may include a medium filament positioned in a first channel 602, a small filament positioned in a second channel 604, and a large filament positioned in a third channel 606. The filaments may be the first filament 376, the second filament 378, and the third filament 380 described with reference to FIG. 3. In other examples, filaments may be of the same or different sizes. The filaments may each be positioned at a different height within a respective channel with respect to a rear of the base 444 (see FIG. 4). Each of the filament of the first channel 602, the filament of the second channel 604, and the filament of the third channel 606 may have a lateral spacing with regards to adjacent filaments, wherein lateral spacing is defined as a lateral distance, with regards to a horizontal axis (e.g., the x-axis), between a center point of a first filament diameter to a center point of a second filament diameter.

To accommodate the lateral spacing, the size, and the relative height of each filament, the cathode mask 362 may be configured with a geometry to focus the electrons emitted from the filaments into the single electron beam. In one example, the central opening 340 and the perimeter 338 of the central opening 340 may include various bend features. For example, the central opening 340 may have a u-shape and the perimeter 338 may comprise a rolled over edge. Such bend features may maintain a similar distance between the perimeter and each filament, allowing field strength for higher electric field intensity. For example, the bend features may include more than one bend, bends of various bend radii, and bends of various dimensions.

As a first example of a bend feature, a first bend feature 680 includes a first axis 608 and a second axis 610 arranged in parallel with the x-axis and a second bend feature 682 includes a third axis 612 and a fourth axis 614 arranged in parallel with the y-axis. The perimeter 338 converges with the first axis 608 until the first bend feature 680. In one example, the first bend feature 680 may have a first bend radius ranging from 2 millimeters (mm) to 6 mm and a first bend dimension 676 ranging from 4.1 mm to 4.7 mm. The first bend feature 680 may be a longitudinal bend into the y-axis. The perimeter 338 converges with the second axis 610 at a second bend feature 682. The second bend feature 682 may have a second bend radius. In one example, the first bend radius of the first bend feature 680 and the second bend radius of the second bend feature 682 may be different dimensions. For example, the second bend feature 682 may have a second bend radius ranging from 12 mm to 14 mm and a second bend dimension 674 ranging from 3 mm to 5 mm. The second bend feature may be a lateral bend into the x-axis. In the example shown, the perimeter 338 includes a third bend feature 684 mirroring the second bend feature 682 and a fourth bend feature 686 mirroring the first bend feature 680. The first bend feature 680, the second bend feature 682, the third bend feature 684, and the fourth bend feature 686 form a u-shape looking down the z-axis. In one example, first bend feature 680, the second bend feature 682, the third bend feature 684, and the fourth bend feature 686 have a profile tolerance based on the dimensions and radii. In one example, the profile tolerance is +/−1 mm.

Incorporating bend features into the central opening of the cathode mask as disclosed herein increases x-ray image quality by tuning the focusing field to the size, strength, and position of each of the one or more filaments. As another advantage, the bend features reduce field stress on the termination of the cathode cup, which correspondingly increases high voltage stability. Another example of a bend feature is described in more detail below.

FIG. 7 shows a cross-sectional view 700 of the cathode assembly 300 of FIG. 3, as defined by a lateral cut taken along a dashed line 7-7 in FIG. 6. Like components are numbered similarly as in FIG. 3. A set of reference axes 701 are provided for comparison between views shown, indicating an x-axis, a y-axis, and a z-axis.

The cross-sectional view 700 shows heights of the first filament 376 in the first channel 602 and the second filament 378 in the second channel 604 relative to the rear face 426 of the cathode cup 62. The u-shaped bend feature, such as described with reference to FIG. 6, may maintain a similar distance between the perimeter and the filaments. Conversely, if a traditional circular cathode cup shield (or cathode mask) or a uniform rectangular shield were used, field intensity around the filaments may be minimized, especially around the smallest filament and/or the filament set furthest back from a uniform perimeter.

In the example shown, a first plane 702 indicates a y-z plane slicing through the perimeter 338 of the central opening 340 and the second filament 378 in the second channel 604. Relative to the rear face 426, a height of the second filament 378 indicated by dashed arrow 710 and a height of the perimeter 338 indicated by dashed arrow 708 have a first difference indicated by dashed arrow 712. The first difference may be a depth measured at the first plane 702 between an x-z plane parallel with the second filament 378 and an x-z plane parallel with the perimeter 338. A second plane 704 indicates a y-z plane slicing through the perimeter 338 and the first filament 376 in the first channel 602. Relative to the rear face 426, a height of the first filament 376 indicated by dashed arrow 706 and a height of the perimeter 338 indicated by dashed arrow 714 have a second difference indicated by dashed arrow 716. The second difference may similarly represent a depth measured at the second plane 704 between an x-z plane parallel with the first filament 376 and x-z plane parallel with the perimeter 338. Note that dashed arrow 714 and dashed arrow 706 extend to the rear face 426, but are only shown as partial arrows. In one example, the first difference and the second difference may be similar. In one example, the first difference and the second difference may differ by no more than a threshold amount. In other words, each coiled filament may be arranged within a threshold depth from the rolled over edge of the cathode mask. In one example, a driver of the shape of the disclosed cathode mask may be the maintenance of a roughly similar difference between the perimeter of the central opening and each of the one or more coiled filaments.

The cross-sectional view 700 shows a rolled over edge 718. The rolled over edge 718 may be tuned to reduce localized electron emission field stress on the end of the cathode mask, e.g., the perimeter 338 of the central opening 340. In one example, the rolled over edge may be a vertical bend into the z-axis. An example of a cathode mask, including a shape of the rolled over edge, is described in more detail with reference to FIG. 8 and FIGS. 9A-9B.

FIG. 8 shows a perspective view of an example of a cathode mask 800 that may be part of a cathode shield assembly for a cathode. Cathode mask 800 may be the same or similar to the cathode mask 362 described with reference to FIG. 3-7. A set of reference axes 801 are provided for comparison between views shown, indicating an x-axis, a y-axis, and a z-axis.

In one example of the disclosed cathode shield assembly, a cathode mask 800 is a prismatic shape having a rectangular extension 811. The cathode mask 800 is mirror symmetric with reference to lateral symmetry line 802. In other examples of the disclosed cathode shield assembly, the cathode mask may not be laterally symmetric. The cathode mask 800 has a first sidewall 804, a second sidewall 806, and a third sidewall 808. The first sidewall 804 opposes the second sidewall 806 and the third sidewall 808 is arranged perpendicular to and interposed between the first sidewall 804 and the second sidewall 806. The cathode mask 800 has a front panel 812 that is arranged perpendicular to the first sidewall 804, the second sidewall 806, and the third sidewall 808. The cathode mask 800 has a short extension 810 from the front panel 812 that is parallel with the third sidewall 808. The first sidewall 804, the second sidewall 806, the third sidewall 808, and the front panel 812 meet at no sharp angles. For example, a transition surface 814 between the front panel 812 from the first sidewall 804 may gently round or fillet from the x-z orientation of the front panel 812 into to the y-z orientation of the first sidewall 804.

In the example shown, excluding the rectangular extension 811, the general dimensions of cathode mask 800 may include a first height 822, a first depth 826, and a first width 838. The front panel 812 extends a second depth 840 that is a fraction of the first depth 826 and may be approximately half the first depth 826. The short extension 810 has a second height 846 that is a fraction of the first height 822.

The rectangular extension 811 is positioned in an upper half of the cathode mask 800 relative to a horizontal centerline 803. The rectangular extension 811 may have a first segment 816, a second segment 818, a third segment 832, and a fourth segment 834. The first segment 816 is an extension of the first sidewall 804, the second segment 818 is an extension of the second sidewall 806, and the third segment 832 is an extension of the third sidewall 808. The fourth segment 834 intersects with the front panel 812 approximately perpendicularly and in this way forms a short wall. The first segment 816 and the second segment 818 may have a third length 830 that is a fraction of the first depth 826. The third segment 832 and the fourth segment 834 may be approximately as long as the first width 838 of the general dimensions of the cathode mask 800.

The rectangular extension 811 may be substantially u-shaped shaped relative to the lateral symmetry line 802. For example, the rectangular extension 811 may have taller sides of a second height 842 and a shorter middle section of a third height 844. The first segment 816 and the second segment 818 may be approximately the second height 842. The third segment 832 and the fourth segment 834 may be approximately the second height 842 near edges with the first segment 816 and the second segment 818, decreasing to the third height 844 in the direction of the lateral symmetry line 802. The shape of the rectangular extension may be influenced by the dimensions of the focusing element and arrangement of coiled filaments therein.

The first segment 816, the second segment 818, the third segment 832, and the fourth segment 834 may have an extension surface 848. The extension surface 848 may be a portion of an exterior shield surface 850. The first sidewall 804, the second sidewall 806, the third sidewall 808, and the short extension 810 may have a prism perimeter surface 825. The central opening of the cathode mask 800 may be defined by an opening in the extension surface 848, an opening on the interior shield surface 852, and a perimeter surface 824. In this way, the extension surface 848 may form a perimeter or frame around the central opening.

In one example, the extension surface 848 comprises a rolled over edge. For example, the extension surface 848 bends or curls inward toward the interior shield surface 852, forming a bent end transition around the opening. For example, the extension surface 848 may bend from a plane approximately perpendicular to the x-y plane on which the cathode mask 800 sits in the example into a plane nearly parallel with the x-y plane. When assembled in a cathode assembly, the central opening may receive the cathode cup, the prism perimeter surface 825 may be approximately flush with the rear face of the cathode cup, and the extension surface 848 may frame the focusing element, such as the rear face 426 and the focusing element 375 of the cathode cup 62 described with reference to FIG. 2-7.

FIG. 9A shows a cross-sectional view 900 of the cathode mask 800 of FIG. 8, as defined by a lateral cut taken along a dashed line 9-9 in FIG. 8. The cross-sectional view 900 shows an example of a focusing feature of the cathode mask 800. The focusing feature may be an end transition of the central opening of the cathode mask. In the example, the end transition may be a perimeter comprising a rolled over edge. FIG. 9B is a detail view 950 of the cross section shown in FIG. 9A. Like components are numbered similarly as in FIG. 8. A set of reference axes 901 are provided for comparison between FIGS. 9A and 9B, indicating an x-axis, a y-axis, and a z-axis.

The cross-sectional view 900 is taken through the third segment 832 of the third sidewall 808 and the fourth segment 834 of the front panel 812 to illustrate a rolled over edge 902. A wall 904 of the cathode mask 800 may be bent to form the rolled over edge 902. For example, the wall 904 in the area of the rectangular extension 811 may be formed with a vertical bend into the z-axis, where inward is toward a centerline 911 of the central opening. The bend of the wall 904 may round nearly into the longitudinal axis. The rolled over edge 902 may include the extension surface 848 being substantially round and the perimeter 906 facing the centerline 911.

The bend of rolled over edge 902 may be similar on each side of the rectangular extension 811 such that the first segment 816, the second segment 818 (see FIG. 8), the third segment 832, and the fourth segment 834 may bend with similar dimensions. The rolled over edge 902 may protect the perimeter 906 from field stress and provide sufficient focusing fields for the one or more coiled filaments.

FIG. 9B shows in detail example dimensions of the rolled over edge 902. The rolled over edge 902 is advantageous for electro-statics and limiting the kV/mm in the shielded areas.

The rolled over feature will give the same kV/mm as a larger radius without extending "farther down" towards the grid electrode (e.g., focusing element 375). By not extending farther down, it keeps the opening larger, which allows for more focusing fields and increased emission.

In the example shown, the rolled over edge 902 may be approximately parallel with a first axis 908 over a first length 910. A right angle is formed by an intersection of a second axis 914 with the first axis 908. A third axis 916 intersects with the perimeter 906, the first axis 908, and the second axis 914. The intersection of the third axis 916 and the second axis 914 forms a bend angle 912. In one example, the bend angle 912 may have a lower threshold angle of 69° and an upper threshold angle of 75°.

A first bend 918 has a first bend radius 920. In one example, the first bend radius 920 may have a lower threshold radius of 1.5 mm and an upper threshold radius of 2.5 mm. A second bend 922 has a second bend radius 924. In one example, the second bend radius 924 may have a lower threshold radius of 1.9 mm and an upper threshold radius of 2.5 mm. In one example, the first bend radius 920 and the second bend radius 924 may be different dimensions. The rolled over edge 902 includes a first bend length 928 that may be a length of the first bend 918 and the second bend 922 relative to the y-axis between the second axis 914 and a fourth axis 926. The rolled over edge 902 includes a second bend length 930 that may be a length of the first bend 918 and the second bend 922 relative to the z-axis. In one example, the first bend length 928 may be greater than the second bend length 930.

Thus, in at least some examples, the cathode mask disclosed herein may include various bend features. That is, the bending of the end transition, e.g., rolled over edge 902, and the u-shaped bend of the central opening e.g., central opening 340. Such focusing features of the cathode mask, e.g., cathode mask 800, may work together to increase focusing fields for one or more coiled filaments of different strength and/or different dimension, and to reduce high voltage instability.

FIG. 10 shows a perspective view of an example of a second shield part 1000 that may be part of a cathode shield assembly for a cathode. The second shield part 1000 may be the same or similar to the second shield part 304 described with reference to FIG. 3-7. A set of reference axes 1001 are provided for comparison between views shown, indicating an x-axis, a y-axis, and a z-axis.

In one example of the disclosed cathode shield assembly, the second shield part 1000 may be substantially ring shaped. The second shield part 1000 is radially symmetric with reference to a radial symmetry line 1002. The second shield part 1000 has a ring wall 1004. The ring wall 1004 has a ring exterior surface 1006 and a ring interior surface 1008. The second shield part 1000 has a central hollow, the central hollow defined by a first circular opening on an inner face 1014, a second circular opening on an outer face 1016, and the ring interior surface 1008. In one example, the second shield part 1000 may have a flat rim 1012 the inner face 1014 and a flared lip 1010 on the outer face 1016. When assembled in a cathode assembly, the central hollow may surround a lower extender, such as the lower extender 405 in FIG. 4. The flared lip 1010 may abut a ceramic insulator, such as the minor insulator 428 in FIG. 4. The flat rim 1012 may sit on a mating portion of the lower extender. In one example, the ring interior surface 1008 of the flat rim 1012 may make face sharing contact with a surface of the one or more windows of the lower extender, such as lower extender window surface 456 of windows 450 in FIG. 4.

The second shield part 1000 may have a ring length 1018 relative to the y-axis. The second shield part may have a first interior radius 1020 and a second interior radius 1022 relative to the radial symmetry line 1002. The first interior radius 1020 may be determined based on, for example, dimensions of the lower extender, e.g., lower extender 405. The second interior radius 1022 may be determined based on a shape of the flared lip 1010, such as, the angle of the flaring. The ring length 1018 may be determined based on a few factors. For example, radiation heat transfer may be increased by keeping the gap space, e.g., gap spacing 478 with reference to FIG. 4, between the first shield part, e.g., first shield part 302, and the second shield part 1000 as open as possible. However, reducing the second shield length too greatly reduces shielding of the cathode components that are at ground. In addition, reducing shielding over low-temperature components may not contribute meaningfully to cooling. Determining the appropriate length may consider trade-offs between covering welding, which interferes with high voltage stability, and allowing for as much radiative heat transfer as useful.

In contrast with unitary cathode shielding, such as is common in X-ray systems, by separating the shields into a first shield part and a second shield part, the disclosed shielding increases radiative heat transfer to the frame and reduces overall cathode temperatures. The disclosed bend features of the cathode mask have the additional advantages of increasing focusing power of one or more coiled filaments (e.g., the exemplary three-filament arrangement shown in FIGS. 3-7) and reducing field stress on the termination of the cathode mask. When used in a smart cathode system, the cathode shield assembly may provide increased high voltage stability, longer tube life, and increased resolution and precision for a variety of X-ray applications.

In some examples, the disclosed cathode shielding may include a cathode mask with a central opening and perimeter having differently shaping. As one example, a cathode assembly may include a cathode cup having only a single coiled filament. For a cathode assembly as such, in one example, the cathode mask may have a square extension, as opposed to the rectangular extension, and a perimeter of the central opening may include a rolled over edge. Alternatively, the extension may be ovoid or circular with a perimeter having the bent end transition. As another example, the cathode assembly may include the coiled filaments arranged in the cathode cup in such a way that straight sides, rather than the exemplary u-shape, may be appropriate for field focusing. In such examples, cathode shielding including the open sections, e.g., the gap spacing and increased view factor, may provide the increased radiative heat transfer advantage while supporting a variety of cathode cup and coiled filament arrangements.

In other examples, the disclosed cathode shielding may include a cathode mask with a central opening having a perimeter shaped with one or more bend features e.g., cathode mask 800, used in combination with a different arrangement complementary shield parts. For one example, a cathode mask with a u-shaped central opening and rolled over edge may be used with a differently shaped disk shield. For example, the disk shield may be shaped differently to increase view factor to a differently shaped frame and/or to shield a larger or differently positioned insulator. In such examples, a cathode mask incorporating the disclosed bend features of the central opening and perimeter may provide the increased focusing fields for smart cathodes having one or more coiled filaments while supporting a variety X-ray tube designs.

In this way, by using selective shielding in areas of high field stress and keeping other areas open, heat conduction and concentration in and around temperature-sensitive cathode components may be reduced. By shaping the cathode mask shield to tune focusing of the one or more coiled filaments, a smart cathode may provide a range of current suitable to diagnostic applications and interventional applications without losing focusing power. The technical effect is longer X-ray tube life, increased X-ray tube reliability, and increased X-ray beam emission performance.

The disclosure also provides support for a shield assembly for a cathode, comprising: a first shield part and a second shield part, the first shield part and the second shield part spaced apart such that the first shield part and the second shield part are not in direct physical contact. In a first example of the system, the first shield part comprises a disk shield and a cathode mask and the second shield part surrounds a lower extender of the cathode. In a second example of the system, optionally including the first example, the disk shield comprises a substantially concave disk having a curved lip and the cathode mask comprises a central opening configured to receive a cathode cup. In a third example of the system, optionally including one or both of the first and second examples, the disk shield comprises a first cutout through which a cathode cup protrudes, the first cutout substantially rectangular and offset from a center of the disk shield. In a fourth example of the system, optionally including one or more or each of the first through third examples, the second shield part is substantially ring shaped. In a fifth example of the system, optionally including one or more or each of the first through fourth examples, the cathode mask comprises a prismatic shape with a rectangular extension. In a sixth example of the system, optionally including one or more or each of the first through fifth examples, the second shield part is a ring shaped member having a flared lip on a first circular opening and a flat rim on an opposing, second circular opening. In a seventh example of the system, optionally including one or more or each of the first through sixth examples, the disk shield, and the cathode mask are an integrally formed, single continuous member.

The disclosure also provides support for a cathode assembly for an x-ray device, comprising: a cathode cup housing a focusing element of the cathode cup, a lower extender coupling to the cathode cup to an insulator and enclosing electrical leads, and a cathode shield assembly comprising a first shield part and a second shield part, the first shield part and the second shield part spaced apart such that the first shield part and the second shield part are not in direct physical contact. In a first example of the system, the first shield part comprises a disk shield and a cathode mask and the second shield part surrounds the lower extender. In a second example of the system, optionally including the first example, the system further comprises: a gap spacing between the first shield part and the second shield part, the gap spacing exposing a rear face of the cathode cup and portion of the lower extender. In a third example of the system, optionally including one or both of the first and second examples, the first shield part and the second shield part are formed from electro-polished nickel. In a fourth example of the system, optionally including one or more or each of the first through third examples, the cathode cup is tiltingly mounted to the lower extender. In a fifth example of the system, optionally including one or more or each of the first through fourth examples, the focusing element comprises more than one coiled filament. In a sixth example of the system, optionally including one or more or each of the first through fifth examples, the disk shield comprises a substantially concave disk having a curved lip and the cathode mask has a central opening configured to receive the cathode cup, and the second shield part is substantially ring shaped.

The disclosure also provides support for an imaging system, comprising: a collector assembly, an anode assembly, a cathode assembly configured to focus an electron beam on the anode assembly, and a frame, the frame housing at least a portion of the collector assembly, the anode assembly, and the cathode assembly, wherein the cathode assembly comprises a cathode cup mounted on a lower extender and a cathode shield assembly, the cathode shield assembly comprising a first shield part and a second shield part, the first shield part and the second shield part spaced apart such that the first shield part and the second shield part are not in contact. In a first example of the system, the first shield part comprises a disk shield and a cathode mask and the second shield part surrounds the lower extender. In a second example of the system, optionally including the first example, the cathode shield assembly exposes a portion of the cathode cup having an electric field stress intensity less than a threshold intensity and a view factor to the frame greater than a threshold emissivity. In a third example of the system, optionally including one or both of the first and second examples, the collector assembly includes a window through which x-rays generated by the anode assembly are emitted, and an electron collector for absorbing backscatter electrons within the imaging system. In a fourth example of the system, optionally including one or more or each of the first through third examples, the anode assembly comprises a target on which the electron beam is focused, a rotor, and a bearing arm.

FIGS. 2-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

As used herein, an element or step recited in the singular and preceded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising,” “including,” or “having” an element or a plurality of elements having a particular property may include additional such elements not having that property. The terms “including” and “in which” are used as the plain-language equivalents of the respective terms “comprising” and “wherein.” Moreover, the terms “first,” “second,” and “third,” etc. are used merely as labels, and are not intended to impose numerical requirements or a particular positional order on their objects.

As used herein, the term “approximately” is construed to mean plus or minus five percent of the range unless otherwise specified, and the term “substantially concave” means that the elements are sufficiently concave to be considered concave to one of ordinary skilled in the art without being perfectly concave. As used herein, the term “substantially rectangular” means that the elements are sufficiently rectangular to be considered rectangular to one of ordinary skilled in the art without being perfectly rectangular. As used herein, the term “substantially prismatic” means that the elements are sufficiently prismatic to be considered prismatic to one of ordinary skilled in the art without being perfectly prismatic.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A cathode assembly for an x-ray device, comprising:

a cathode cup housing a focusing element of the cathode cup;

a lower extender having a mount wall arranged approximately perpendicular to a centerline of the lower extender at a first end, wherein the cathode cup is mounted on the mount wall, an insulator is mounted on and fully circumferentially surrounds the lower extender such that a length of the insulator is parallel to the centerline, and the lower extender encloses electrical leads that are coupled to the cathode cup; and a cathode shield assembly comprising a first shield part and a second shield part, wherein the second shield part fully circumferentially surrounds the lower extender such that a length of the second shield part is parallel to the centerline of the lower extender, and wherein the first shield part and the second shield part are spaced apart such that the first shield part and the second shield part are not in direct physical contact.

2. The cathode assembly of claim 1, wherein the first shield part comprises a disk shield and a cathode mask.

3. The cathode assembly of claim 2, wherein the disk shield comprises a substantially concave disk having a curved lip, the cathode mask has a central opening configured to receive the cathode cup, and the second shield part is substantially ring shaped, and wherein a ring interior surface of the second shield part is in face-sharing contact with an exterior surface of the lower extender.

4. The cathode assembly of claim 1, further comprising a gap spacing parallel to the centerline of the lower extender between the first shield part and the second shield part, the gap spacing exposing a rear face of the cathode cup and portion of the lower extender.

5. The cathode assembly of claim 1, wherein the first shield part and the second shield part are formed from electro-polished nickel.

6. The cathode assembly of claim 1, wherein the cathode cup is tiltingly mounted to the lower extender at the mount wall of the lower extender.

7. The cathode assembly of claim 1, wherein the focusing element comprises more than one coiled filament.

8. An imaging system, comprising:

a collector assembly;

an anode assembly;

a cathode assembly configured with a cathode cup to focus an electron beam on the anode assembly; and a frame, the frame housing at least a portion of the collector assembly, the anode assembly, and the cathode assembly, wherein the cathode assembly comprises the cathode cup mounted on a lower extender and a cathode shield assembly, the cathode shield assembly comprising a first shield part and a second shield part, wherein the first shield part comprises a disk shield and a cathode mask configured to receive the cathode cup, and wherein the first shield part and the second shield part are spaced apart such that the first shield part and the second shield part are not in contact.

9. The imaging system of claim 8, wherein the second shield part surrounds the lower extender.

10. The imaging system of claim 8, wherein the cathode shield assembly exposes a portion of the cathode cup having an electric field stress intensity less than a threshold intensity of 2.5*106 V/m and a view factor to the frame greater than a threshold emissivity of more than 0.4 emissivity.

11. The imaging system of claim 8, wherein the collector assembly includes a window through which x-rays generated by the anode assembly are emitted, and an electron collector for absorbing backscatter electrons within the imaging system.

12. The imaging system of claim 8, wherein the anode assembly comprises a target on which the electron beam is focused, a rotor, and a bearing arm.

13. A cathode assembly for an x-ray device, comprising:

a cathode cup housing a focusing element and one or more filaments;

a lower extender enclosing electrical leads that are electrically coupled to the one or more filaments; and a cathode shield assembly comprising a first shield part and a second shield part, wherein the second shield part circumferentially surrounds the lower extender, the first shield part comprises a disk shield and a cathode mask configured to receive the cathode cup, and wherein the first shield part and the second shield part are spaced apart with a gap therebetween such that the first shield part and the second shield part are not in direct physical contact.

14. The cathode assembly of claim 13, wherein the second shield part is substantially ring shaped with a central hollow, and the lower extender is positioned in the central hollow of the second shield part.

15. The cathode assembly of claim 13, wherein the lower extender has a mount wall arranged approximately perpendicular to a centerline of the lower extender at a first end, and wherein the cathode cup is mounted on the mount wall.

16. The cathode assembly of claim 15, wherein the second shield part fully circumferentially surrounds the lower extender such that a length of the second shield part is parallel to the centerline of the lower extender.

17. The cathode assembly of claim 13, wherein a diameter of the disk shield is greater than a diameter of the second shield part, and the diameter of the disk shield is parallel to the diameter of the second shield part.

18. The cathode assembly of claim 13, wherein a disk shield width of the disk shield, a gap spacing of the gap between the first shield part and the second shield part, and a length of the second shield part are axially aligned along a centerline.

19. The cathode assembly of claim 13, wherein the cathode cup is partially enclosed by the cathode mask.

20. The cathode assembly of claim 13, wherein the disk shield includes a cutout for receiving the cathode cup.

* * * * *